US008041801B2

(12) United States Patent
Nakamura et al.

(10) Patent No.: US 8,041,801 B2
(45) Date of Patent: Oct. 18, 2011

(54) INFORMATION RECOMMENDATION SYSTEM BASED ON BIOMETRIC INFORMATION

(75) Inventors: Takatoshi Nakamura, Kanagawa (JP); Toru Sasaki, Tokyo (JP); Yuichi Sakai, Kanagawa (JP); Yoichiro Sako, Tokyo (JP); Toshiro Terauchi, Tokyo (JP); Hirofumi Tamori, Tokyo (JP); Makoto Inoue, Tokyo (JP); Katsuya Shirai, Kanagawa (JP); Motoyuki Takai, Tokyo (JP); Kenichi Makino, Kanagawa (JP); Akihiro Komori, Tokyo (JP); Akane Sano, Tokyo (JP); Susumu Takatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 407 days.

(21) Appl. No.: 12/278,157

(22) PCT Filed: Jan. 31, 2007

(86) PCT No.: PCT/JP2007/051549
§ 371 (c)(1),
(2), (4) Date: Oct. 3, 2008

(87) PCT Pub. No.: WO2007/091456
PCT Pub. Date: Aug. 16, 2007

(65) Prior Publication Data
US 2009/0271496 A1    Oct. 29, 2009

(30) Foreign Application Priority Data
Feb. 6, 2006   (JP) .................................. 2006 028101

(51) Int. Cl.
*G06F 15/173* (2006.01)
(52) U.S. Cl. .......... 709/223; 709/204; 709/205; 84/612; 84/615; 84/636; 600/412; 600/504; 600/509; 600/520; 600/526; 340/321

(58) Field of Classification Search .................. 709/204, 709/205; 84/612, 615, 636; 600/412, 504, 600/509, 520, 526; 340/321
See application file for complete search history.

(56) References Cited

U.S. PATENT DOCUMENTS
4,776,323 A   10/1988   Spector
(Continued)

FOREIGN PATENT DOCUMENTS
EP    0 961 209 A1    12/1999
(Continued)

OTHER PUBLICATIONS

"Portable audio player combined with physical training measurement unit, detects user exercise rate and heartbeat, relating them to calories consumed and training requirements", WPI/Thomson, AN 2006-783582, XP-008093170, Jan. 1, 2006, 1 page.

(Continued)

*Primary Examiner* — Tina Nguyen
(74) *Attorney, Agent, or Firm* — Oblon, Spivak, McClelland, Maier & Neustadt, L.L.P.

(57) ABSTRACT

State information of a user is detected via a biometric information sensor and is stored, in a nonvolatile memory, in association with a content identifier of content that is being reproduced for the user when the state information is detected. An information request, including the state information of another user at another terminal apparatus, is generated and transmitted. Provided information transmitted in response to the information request is received and provided to the user. When an information request is received by the user, information is extracted from the nonvolatile memory based on the state information of another user. Provided information that is based on the extracted information is transmitted to another user.

8 Claims, 14 Drawing Sheets

U.S. PATENT DOCUMENTS

| | | | |
|---|---|---|---|
| 4,788,983 A | 12/1988 | Brink et al. | |
| 7,514,623 B1 * | 4/2009 | Spinler et al. | 84/612 |
| 2003/0060728 A1 * | 3/2003 | Mandigo | 600/545 |
| 2005/0129253 A1 | 6/2005 | Chen | |
| 2006/0031402 A1 | 2/2006 | Saito et al. | |
| 2006/0107822 A1 * | 5/2006 | Bowen | 84/612 |
| 2007/0074619 A1 * | 4/2007 | Vergo | 84/612 |
| 2007/0118043 A1 * | 5/2007 | Oliver et al. | 600/519 |

FOREIGN PATENT DOCUMENTS

| | | |
|---|---|---|
| EP | 1 244 033 A2 | 9/2002 |
| EP | 1 244 033 A3 | 9/2002 |
| EP | 1 609 418 A1 | 12/2005 |
| JP | 11 3356 | 1/1999 |
| JP | 2001-265809 | 9/2001 |
| JP | 2005-32167 | 2/2005 |
| JP | 2005 301399 | 10/2005 |

OTHER PUBLICATIONS

Kaji, K. et al., "An Online Music Recommendation System Based on Annotations About Listeners' Preference and Situation", Information Processing Society of Japan Kenkyu Hokoku, pp. 33-38 (2004).

Anderson, M. et al. "RACOFI: A Rule-Applying Collaborative Filtering System", International Workshop on Collaboration Agents: Autonomous Agents for Collaborative Environments (13 pages) (2003).

Japanese Office Action issued Nov. 24, 2010, in Patent Application No. 2006-028101 (with English-language translation).

Shinji Motegi, et al., "Mechanism for Mobile Community Formation Utilizing Mobility Information", Information Processing Society Memoir, Japanese Information Processing Society of Japan, vol. 2000, No. 42, May 25, 2000, pp. 13-18 (with English Abstract).

* cited by examiner

FIG. 3

| ACQUISITION TIME | BIOMETRIC INFORMATION | | | | | | | | EXERCISE INFORMATION | | | |
|---|---|---|---|---|---|---|---|---|---|---|---|---|
| | PULSES | HEARTBEATS | BODY TEMPERATURE | MYOELECTRIC POTENTIAL | BRAIN WAVES | SWEATING | DIAMETER OF PUPIL | ... | WALKING TEMPO | EXERCISE STATE | ... | CONTENT ID |
| TT:MM | 60 | 60 | 36.5 | XmA | β | MODERATE | Xmm | ... | 90 | WALKING | ... | A |
| ... | ... | ... | ... | ... | ... | ... | ... | ... | ... | ... | ... | ... |

FIG. 4

| BIOMETRIC INFORMATION | | | | | | | EXERCISE INFORMATION | | | | CONTENT ID | APPARATUS ID |
|---|---|---|---|---|---|---|---|---|---|---|---|---|
| PULSES | HEARTBEATS | BODY TEMPERATURE | MYOELECTRIC POTENTIAL | BRAIN WAVES | SWEATING | DIAMETER OF PUPIL | ... | WALKING TEMPO | EXERCISE STATE | ... | | |
| 80 | 80 | 36.6 | XmA | β | HIGH | Xmm | ... | 150 | RUNNING | ... | A | aaa |
| 85 | 85 | 36.5 | XmA | β | HIGH | Xmm | ... | 160 | RUNNING | ... | A | bbb |
| ... | ... | ... | ... | ... | ... | ... | ... | ... | ... | ... | ... | |

There are m people who are running now in a hurry like you.

The most popular song listened to in a hurry is A of ×××.

Please listen.

B  42G

Those who are running now at the same tempo as yours are aaa, bbb, •••.

Would you like to contact them?

Yes  No

INFORMATION RECOMMENDATION SYSTEM BASED ON BIOMETRIC INFORMATION

TECHNICAL FIELD

The present invention relates to an apparatus, a method, and a program to provide and receive provision of various pieces of content information of music, video, books, programs, and the like, and other information.

BACKGROUND ART

Various services using the Internet have been provided, for example, a download service of music data (music content) through the Internet and an Internet shopping service enabling a user to purchase an item by transmitting an order through the Internet.

In the music data download service and the Internet shopping service, music data and items that would be liked by a user are introduced and recommended based on a music data download history and an item purchase history. Such provision of information is advantageous for both a provider and a user. That is, a service provider can use it for sales promotion, whereas a user of the service can save time to collect information.

Also, a trend of tastes of users is recognized in view of download histories of users who downloaded the same music data or purchase histories of users who purchased the same item, thereby specifying and recommending music data or item to be recommended. For example, Japanese Unexamined Patent Application Publication No. 11-3356 discloses a technique of visually displaying similarity in interest on a two-dimensional distance plane by considering interest states of users to be provided with information through the Internet.

By using the technique described in Japanese Unexamined Patent Application Publication No. 11-3356, a similar user can be easily found, and information required by oneself can be easily searched for based on the interest of the similar user. That is, a user can actively search for and obtain necessary information, while the user can be only provided with recommendation information or the like from a provider in the related art.

DISCLOSURE OF INVENTION

The technique described in Japanese Unexamined Patent Application Publication No. 11-3356 mentioned above is characterized in a method for providing information to a user, but basically has a mechanism of mutual recommendation between users who like the same song based on matching of interest states (e.g., favorite songs owned by the users) of the users to be provided with information through the Internet.

Specifically, in a case of a music data download service, for example, when there is user A having song X and song Y, it is estimated that user B who likes song X may also likes song Y and song Y is recommended. This determination is based on only commonality of song X. That is, this is a recommending method of "person who buys this song also buys that song".

Actually, however, taste changes in real time and a song required at this present time also changes. Of course, a favorite artist and a favorite song based on an experience exist, but the song required at this present time depends to a large degree on parameters, such as feeling and behavior of the time.

In view of the above-described points, the present invention is directed to enabling a user to receive provision of appropriate information based on a parameter according to feeling and/or behavior of the user at that time.

In order to solve the above-described problems, a communication terminal apparatus according to the invention described in Claim 1 is characterized in comprising: detecting means for detecting state information of a user; first storage means for storing and holding the state information detected by the detecting means and predetermined additional information by associating the state information and the additional information with each other; request transmitting means for transmitting an information provision request including the state information detected by the detecting means and a predetermined extraction condition; information receiving means for receiving provided information that is transmitted in response to the information provision request transmitted by the request transmitting means; presenting means for presenting the provided information received by the information receiving means or information specified by the received provided information to the user; request receiving means for receiving an information provision request including the state information of a user of another apparatus and a predetermined extraction condition; extracting means for extracting information to be provided from the information stored in the first storage means based on the state information and the extraction condition included in the information provision request when receiving the information provision request by the request receiving means; and information transmitting means for transmitting provided information generated from the information extracted by the extracting means to a requesting source.

According to the communication terminal apparatus described in Claim 1, state information of a user is detected by the detecting means, and the detected state information of the user is stored and held in the first storage means by being associated with predetermined additional information. Then, an information provision request including state information detected at that time by the detecting means and a predetermined extraction condition is transmitted by the request transmitting means.

Then, provided information transmitted in response to the information provision request from the receiver of the transmitted information provision request is received by the information receiving means, and the provided information or information specified by the provided information is presented by the presenting means.

On the other hand, when an information provision request is received by the request receiving means, information to be provided is extracted by the extracting means from the information stored in the first storage means based on the state information and extraction condition included in the received information provision request, and then the information is transmitted to a requesting source by the information transmitting means.

By performing transmission/reception of information between the communication terminal apparatuses having such a function, the communication terminal apparatus on the transmitter side of the provision request can receive provision of information required by the user at that time at appropriate timing in accordance with the state information of the user. On the other hand, the communication terminal apparatus on the receiver side of the provision request can provide information required by the user at that time at appropriate timing in accordance with the state information of the user of a requesting source.

Also, an information providing system according to the present invention described in Claim 5 is an information providing system in which one or more communication terminal apparatuses connect to a server apparatus via a predetermined network, the server apparatus providing information that matches an information provision request from the communication terminal apparatus. The system is characterized in that each of the one or more communication terminal apparatuses comprises: detecting means for detecting state information of a user; transmitting means for transmitting history information to the server apparatus, the history information including the state information detected by the detecting means and predetermined additional information associated with each other; request transmitting means for transmitting an information provision request including the state information detected by the detecting means and a predetermined extraction condition to the server apparatus; information receiving means for receiving provided information transmitted from the server apparatus in response to the information provision request transmitted by the request transmitting means; and presenting means for presenting the provided information received by the information receiving means or information specified by the received provided information to the user, and that the server apparatus comprises: history receiving means for receiving history information transmitted from each of the one or more communication terminal apparatuses; storage means for storing and holding the history information received by the history receiving means; request receiving means for receiving the information provision request transmitted from each of the one or more communication terminal apparatuses; extracting means for extracting information to be provided from the history information stored in the storage means based on the state information and the extraction condition included in the information provision request when receiving the information provision request by the request receiving means; and information transmitting means for generating provided information from the information extracted by the extracting means and transmitting the provided information to the communication terminal apparatus as a requesting source.

According to the information providing system described in Claim 5, on the communication terminal apparatus side, the state information of the user is detected by the detecting means, and the history information in which the detected state information of the user is associated with the predetermined additional information is transmitted to the server apparatus by the transmitting means and is collectively managed in the server apparatus.

Also, for example, an information provision request including the state information detected at that time by the detecting means and the predetermined extraction condition is transmitted to the server apparatus by the request transmitting means at the timing according to instructions from the user, provided information according to the information provision request is extracted in the server apparatus, and the information is transmitted to the communication terminal apparatus as a requesting source. Then, in the communication terminal apparatus as a requesting source, the provided information transmitted from the server apparatus in response to the information provision request is received by the information receiving means, and the provided information or information specified by the provided information is presented by the presenting means.

In this way, the communication terminal apparatus on the transmitter side of the provision request can receive provision of information required by the user at that time from the server apparatus at appropriate timing in accordance with the state information of the user. On the other hand, the server apparatus can collectively manage history information from one or more communication terminal apparatuses and provide information required by the user at that time at appropriate timing in accordance with the state information of the information provision request from each communication terminal apparatus.

According to the present invention, provision of information according to feeling and/or behavior of the moment of a user can be received at appropriate timing. In other words, information required at that time can be obtained at appropriate timing in accordance with the state of the user including the psychological state of the user.

BRIEF DESCRIPTION OF DRAWINGS

FIG. 3 illustrates a history of state information of a user accumulated in a nonvolatile memory 14 of a communication terminal apparatus 100.

FIG. 4 illustrates an example of associated information (provided information) accumulated in an associated information DB 82 of the communication terminal apparatus 100.

FIG. 5 illustrates display examples of information presented to a user of the communication terminal apparatus 100.

BEST MODES FOR CARRYING OUT THE INVENTION

Figure 1:
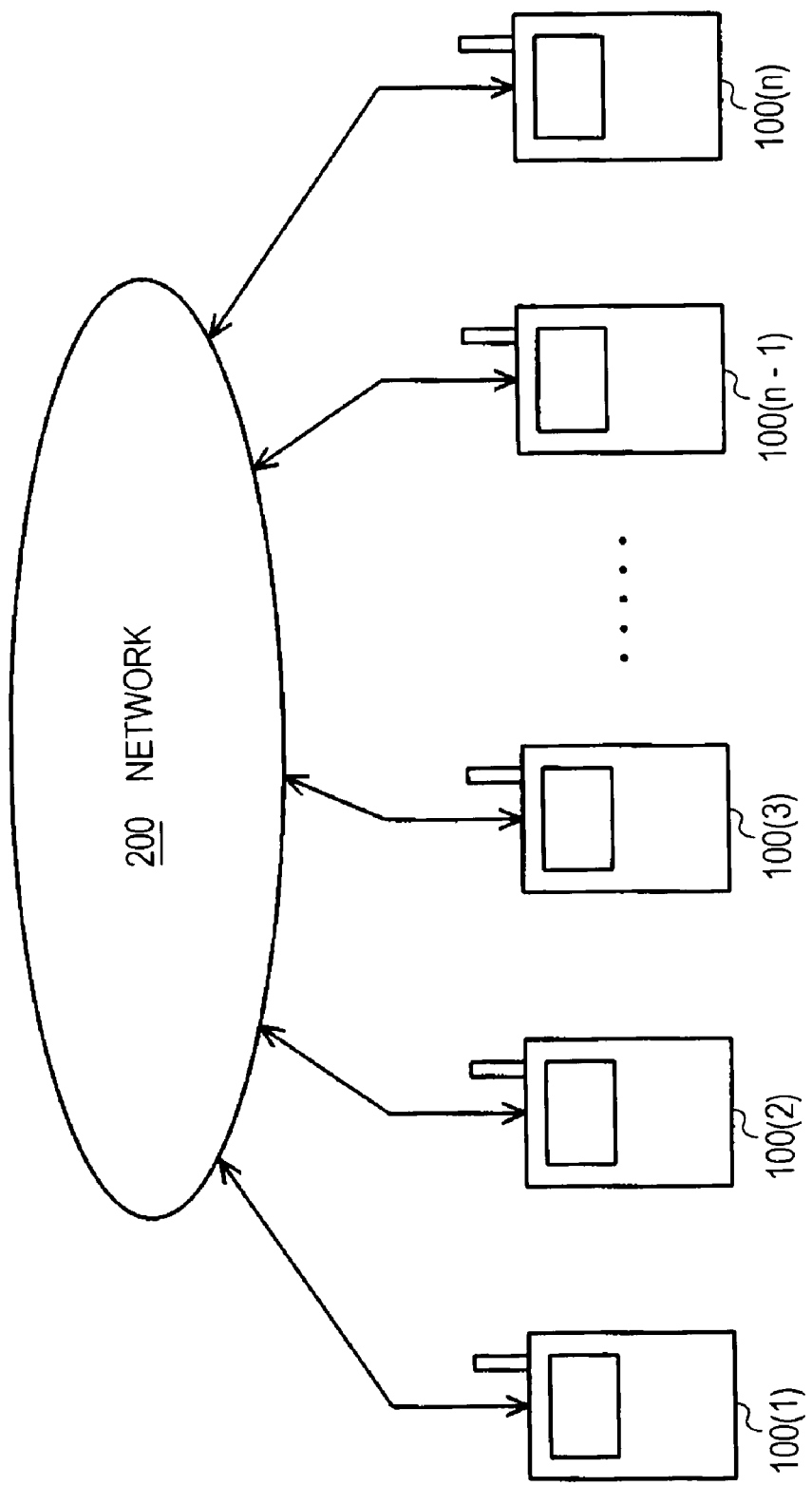
FIG. 1 illustrates a communication system according to a first embodiment.

Hereinafter, an embodiment of an apparatus, a system, a method, and a program according to the present invention is described with reference to the drawings.

[About Basic Concept of the Invention]

Before specifically describing embodiments to which the present invention is applied, a basic concept of the present invention is described. The present invention is directed to providing an apparatus, a system, a method, and a program to recommend content such as music and to introduce a person to get in contact with through matching of biometric information and exercise information of a user of a communication terminal apparatus.

Here, the biometric information includes various pieces of information about the body of a user, such as pulses, heartbeats, and a body temperature, as described below. The exercise information includes information about exercise performed by a user, such as a walking tempo and a state (kind) of exercise being performed. An example of matching of the biometric information or the exercise information is finding people having the same pulses, people having the same walking tempo, people having similar pulses, or people having a similar walking tempo, from a network or a database in which information is precompiled.

Then, it is assumed that people having the same or similar biometric information or exercise information (in this description, the biometric information and exercise information are collectively referred to as state information) are in a relationship of having similar feeling or behavior, and the followings are realized: (1) people having similar feeling or behavior recommend content such as music used by them to each other; and (2) a person having similar feeling or behavior is introduced so that information can be exchanged.

Accordingly, a user can recommend content that matches feeling or behavior of the moment or introduce a person that matches feeling or behavior of the moment so as to enable smoother exchange of information, instead of recommending content data or introducing a person according to taste (preference). Accordingly, a new user interface is realized.

In other words, unlike in a case where provision of information is received by using a so-called static condition: information that matches the taste originally held by a user is introduced such as in a case of purchasing music (music data) that matches the taste, a new condition is required to extract information to be recommended or specify a person to be introduced when a user wants to receive recommendation of a song to listen to while he/she is jogging at a high pace or when the user wants to contact someone imposed with a burden of the same level in order to encourage him/her with each other during exercise, such as walking or jogging.

Conventionally, information of real-time feeling (psychological state) has been believed to be ambiguous and unsuitable as a condition of extracting information. However, in the present invention, attention is focused on that biometric information and exercise information of a user change in accordance with feeling (psychological state) and so on of the user, and the feeling of the user is determined as a set of biometric information and exercise information, so that information can be provided among people having the same kind of feeling (psychological state).

In order to specifically realize the present invention, first and second embodiments are mainly performed. In the first embodiment, provision of information can be received in accordance with user's biometric information, exercise information, and an extraction condition using those pieces of information from each of a plurality of communication terminals. In the second embodiment, a database to manage biometric information and exercise information of users of a plurality of communication terminals is provided, and provision of information can be received in accordance with user's biometric information, exercise information, and an extraction condition using those pieces of information by accessing the database. Hereinafter, the first and second embodiments are described in detail.

First Embodiment

FIG. 1 illustrates a communication system according to a first embodiment including communication terminal apparatuses $100(1)$, $100(2)$, $100(3)$, . . . , and $100(n)$, to which an embodiment of the apparatus, method, and program of the present invention is applied, the communication terminal apparatuses being mutually connected via a predetermined network 200. Each of the communication terminal apparatuses $100(1)$, $100(2)$, $100(3)$, . . . , and $100(n)$ is a mobile apparatus, for example, is carried by being put in a pocket of clothing or a bag of a user, and is usable in an outside location.

On the other hand, the network 200 is a wide area network including a telephone network or a LAN (local area network) in which communicable area is limited to some extent, for example. In recent years, access points have been provided in various sites in order to establish a wireless LAN in a relatively wide area, such as an inner area of Yamanote Line or an entire area of X city, so that various pieces of information can be transmitted/received even in an outside location by accessing the Internet via the LAN. In the first embodiment, the radio LAN established in such a relatively wide area is used as the network 200.

Although details are described below, each of the communication terminal apparatuses $100(1)$, $100(2)$, $100(3)$, . . . , and $100(n)$ according to the first embodiment is capable of communicating with another communication terminal apparatus by accessing the network 200 and is also capable of using various pieces of content, such as music data, AV (audio/visual) data, text data, and a program, by reproducing or executing the content.

Furthermore, each of the communication terminal apparatuses $100(1)$, $100(2)$, $100(3)$, . . . , and $100(n)$ according to this embodiment is capable of detecting user's biometric information and exercise information, transmitting an information provision request, such as a content recommendation request or a user introduction request, based on those pieces of information to the network 200, and receiving provision of content recommendation information or user introduction information according to the biometric information and exercise information from a communication terminal apparatus that has received the information provision request and that holds information according to the information provision request.

That is, each of the communication terminal apparatuses $100(1)$, $100(2)$, $100(3)$, . . . , and $100(n)$ according to the first embodiment has the following ability. When the apparatus receives an information provision request including user's biometric information and exercise information, such as a content recommendation request or a user introduction request, and when information according to the biometric information and exercise information included in the request exists in history information held by the apparatus, the apparatus is capable of generating content recommendation information or user introduction information based on the history information and transmitting the generated information to the communication terminal apparatus as a requesting source.

A reason of providing information in accordance with biometric information and exercise information is to recommend appropriate content according to feeling (psychological state) of a user at the time of detection of the biometric information and exercise information or to introduce an appropriate user to contact. A psychological state of the user is appropriately determined based on the biometric information and exercise information, and then content can be recommended or a user can be introduced accordingly.

[About Example of Configuration of Communication Terminal Apparatus]

Figure 2:
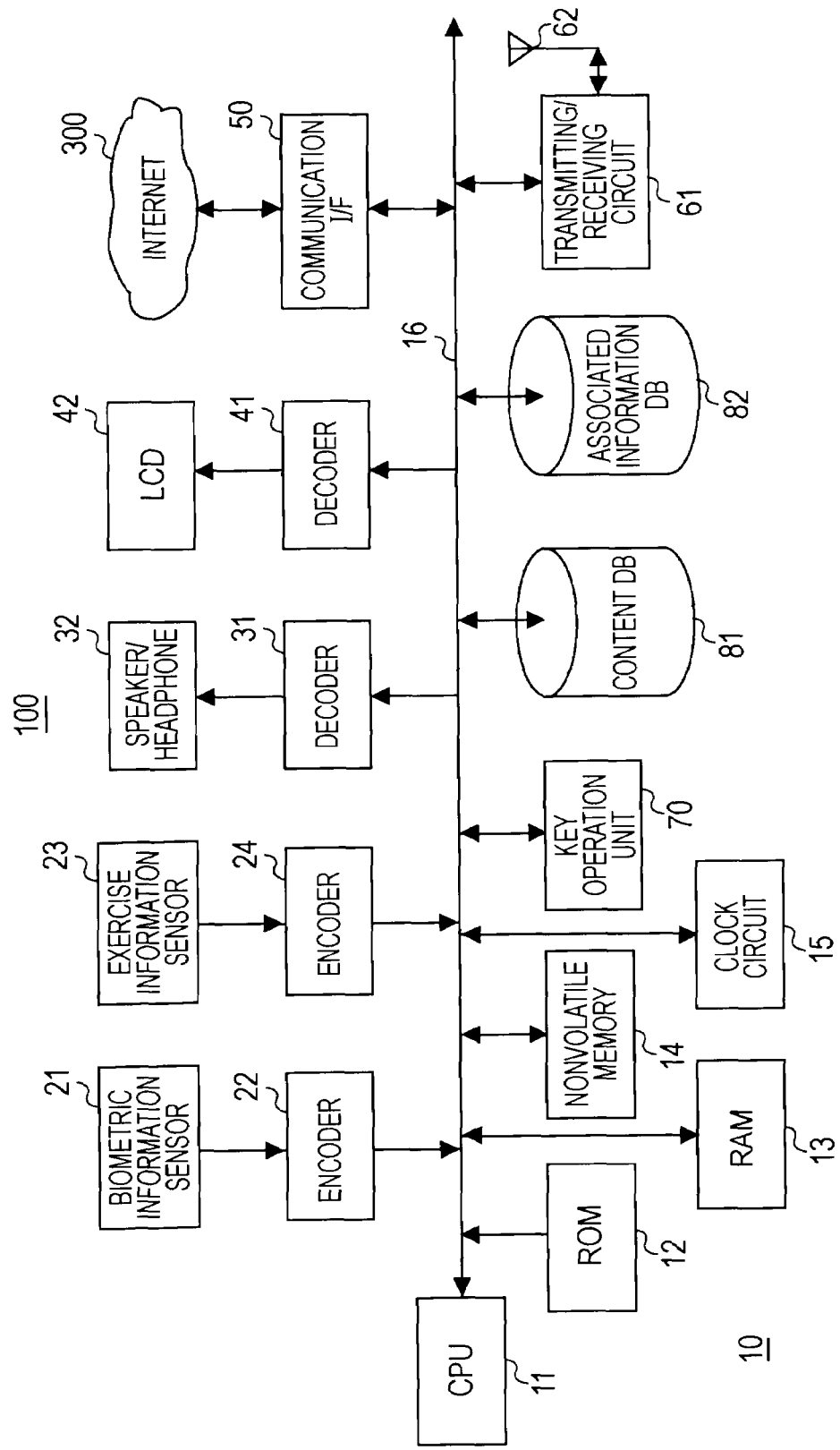
FIG. 2 is a block diagram illustrating a communication terminal apparatus to which an embodiment of the present invention is applied.

In the first embodiment, each of the communication terminal apparatuses $100(1)$, $100(2)$, $100(3)$, . . . , and $100(n)$ has the same configuration, and thus each of the communication terminal apparatuses $100(1)$, $100(2)$, $100(3)$, . . . , and $100(n)$ is referred to as a communication terminal apparatus 100 in the following description. FIG. 2 is a block diagram illustrating an example of a configuration of the communication terminal apparatus 100 according to the first embodiment.

As illustrated in FIG. 2, the communication terminal apparatus 100 according to the first embodiment includes a control unit 10, a biometric information sensor 21, a biometric information encoder 22, an exercise information sensor 23, an exercise information encoder 24, a voice decoder 31, a speaker/headphone 32, a video decoder 41, an LCD (liquid crystal display) 42, a communication interface (hereinafter referred to as a communication I/F) 50, a transmitting/receiving circuit 61, a transmitting/receiving antenna 62, a key operation unit 70, a content database (hereinafter referred to as a content DB) 81, and an associated information database (hereinafter referred to as an associated information DB) 82.

As illustrated in FIG. 2, the control unit 10 is a microcomputer including a CPU (central processing unit) 11, a ROM (read only memory) 12, a RAM (random access memory) 13, a nonvolatile memory 14 such as an EEPROM (electrically erasable and programmable ROM) or a flash memory, and a clock circuit 15, which are mutually connected through a CPU bus 16. The control unit 10 controls each unit of the communication terminal apparatus 100 of this embodiment.

Here, the CPU 11 performs a key role of control. The CPU 11 reads and executes a program stored and held in the ROM 12 or the nonvolatile memory 14, generates control signals to be supplied to the respective units, and supplies them to the respective related units, so as to control the respective units and to allow the respective units to perform a desired process. Also, the CPU 11 receives data from the respective units, processes the data, and records the data in a recording medium.

The ROM 12 stores and holds various data required in programs or processes executed in the CPU 11. The RAM 13 is mainly used as a work area, for example, temporarily stores a midstream result of a process. The nonvolatile memory 14 stores and holds data that should be held even after the power of the communication terminal apparatus 100 of the first embodiment is turned off, for example, various setting parameters, processing programs, and processing results.

The clock circuit 15 includes a crystal oscillator and is capable of accurately measuring and providing current year, month, date, day, and time (hour, minute, and second). Also, the clock circuit 15 has a counter function and is capable of measuring predetermined time (predetermined time width).

In the first embodiment, the biometric information sensor 21 includes various sensors to measure biometric information, such as pulses, heartbeats, a body temperature, a myoelectric potential, brain waves, a sweating state, and the diameter of a pupil, and is capable of measuring various pieces of biometric information of a user and supplying a measurement result to the biometric information encoder 22 in the form of electric signals.

The biometric information encoder 22 receives detection outputs (electric signals) of various pieces of biometric information from the biometric information sensor 21, converts the respective outputs to digital data in a format that can be processed in the control unit 10, and supplies the digital data to the control unit 10. Accordingly, the control unit 10 can recognize various pieces of biometric information of the user.

The exercise information sensor 23 is a triaxial acceleration sensor, for example, obtains a detection output that changes depending on a motion of the user, and supplies the output to the exercise information encoder 24. The exercise information encoder 24 detects an exercise tempo (motion tempo) and an exercise state of the user from the detection output from the exercise information sensor 23 supplied thereto and supplies them to the control unit 10.

Specifically, the exercise information encoder 24 calculates an autocorrelation of the detection output from the exercise information sensor 23 in order to remove a noise component contained in the detection output from the exercise information sensor 23 and to specify an exercise cycle of the user. Then, the exercise information encoder 24 obtains an exercise tempo of the user based on the specified exercise cycle and supplies the exercise tempo to the control unit 10. Accordingly, the control unit 10 recognizes the exercise tempo.

The exercise tempo is a rate of exercise (motion). For example, when the exercise (motion) of the user is walking or running, the exercise tempo is the number of steps per minute. When the exercise is jumping, the exercise tempo is the number of jumps per minute. In this way, the exercise tempo indicates the number of countable smallest motion units (one motion (exercise)) of the user per minute.

Also, the exercise information encoder 24 specifies an exercise state (type of exercise), that is, whether the exercise being performed by the user is walking or jogging, based on an amplitude level of the detection output in a vertical direction of the triaxial acceleration sensor serving as the exercise information sensor 23. That is, comparing walking with jogging, the amount of acceleration component in the vertical direction is larger by twice to three times in jogging than in walking. By using this, whether the exercise being performed by the user is walking or jogging is determined based on an amplitude value in the vertical direction. Information indicating the determination result is generated and is supplied to the control unit 10, which recognizes the information.

Incidentally, the above description is given about the case of determining whether walking or jogging is being mainly performed among exercises performed by the user. Also, the type of exercise being performed, such as jumping rope or cycling, can be determined by detecting a characteristic change in the exercise from a detection output from the exercise information sensor 23. On the other hand, when an exercise state cannot be detected, the type of exercise performed by the user can be input through the key operation unit 70.

In this way, the control unit 10 of the communication terminal apparatus 100 of this embodiment can recognize biometric information and exercise information of the user.

On the other hand, the voice decoder 31 decodes voice data such as music data supplied thereto, converts the voice data to an analog voice signal, and supplies the signal to the speaker/headphone 32. The speaker/headphone 32 serves as a voice output unit for voice signals, and a speaker or a headphone is used therein. Accordingly, voice according to voice data decoded by the voice decoder is output from the speaker/headphone 32.

Also, voice data of various alarm sounds or a voice guidance can be output through the speaker/headphone 32 by supplying the voice data to the voice decoder 31 through the control unit 10.

On the other hand, the video decoder 41 decodes video data supplied thereto to convert it to an analog video signal in a format to be supplied to the LCD 42, and supplies the video signal to the LCD 42. Accordingly, pictures according to the video data decoded by the video decoder are displayed on a display screen of the LCD 42.

Also, various pieces of display information such as an error message and a guidance message can be displayed on the LCD 42 and provided to the user by supplying the information to the video decoder 41 via the control unit 10.

The communication I/F 50 cooperates with the control unit 10 and accesses the Internet 300 through a mobile phone network, for example, so as to transmit or receive data. Various pieces of information can be transmitted/received through the Internet 300. For example, e-mails can be transmitted/received and various content data such as desired music data can be downloaded by accessing the Internet 300 via the communication I/F 50.

In the first embodiment, the transmitting/receiving circuit 61 and the transmitting/receiving antenna 62 can transmit/receive various pieces of information through the network 200 by accessing the network 200, which is a radio LAN, via an access point placed in the neighborhood. For example, an information provision request can be transmitted to the network 200, which is a radio LAN, and provision of desired information can be received from another communication terminal apparatus having information according to the information provision request.

The key operation unit 70 includes numeric keys, alphabet keys, and various function keys, and is capable of accepting operation input from the user and supplying the input as an electric signal to the control unit 10. Accordingly, the control unit 10 can control the respective units and perform a process in response to a request from the user in accordance with operation input by the user accepted via the key operation unit 70.

The content DB 81 has relatively large storage capacity and stores and holds various content data, such as music data, AV data, text data, and application programs. Also, the associated information DB 82 has relatively large storage capacity and stores and holds associated information transmitted from another communication terminal apparatus, as described below in detail.

Incidentally, as a recording medium for the content DB 81 and the associated information DB 82, various types of recording media can be used, for example, a hard disk, an optical disc such as a recordable DVD (digital versatile disc), a magneto-optical disc such as an MD (Mini Disc®), a semiconductor memory, and an IC card memory. In the first embodiment, a hard disk is used as a recording medium for the content DB 81 and the associated information DB 82, for example. Thus, each of the content DB 81 and the associated information DB 82 is a hard disk drive including a hard disk as a recording medium.

In the communication terminal apparatus 100 according to the first embodiment, when instructions to reproduce music data stored and held in the content DB 81 are provided in accordance with operation input from the user accepted via the key operation unit 70, the control unit 10 reads the specified music data from the content DB 81 and supplies the music data to the voice decoder 31 so that music corresponding to the read music data can be output from the speaker/headphone 32.

Also, when instructions to reproduce AV data stored and held in the content DB 81 are provided in accordance with operation input from the user accepted via the key operation unit 70, the control unit 10 reads the specified AV data from the content DB 81, supplies voice data in the AV data to the voice decoder 31, and supplies video data to the video decoder 41 so that the voice corresponding to the voice data in the read AV data is output from the speaker/headphone 32 and that the pictures corresponding to the video data in the read AV data are displayed on the display screen of the LCD 42.

Also, when instructions to reproduce text data stored and held in the content DB 81 are provided in accordance with operation input from the user accepted via the key operation unit 70, the control unit 10 reads the specified text data and supplies the text data to the video decoder 41 so that the text data can be displayed on the display screen of the LCD 42.

Also, when instructions to execute a program stored and held in the content DB 81 are provided in accordance with operation input from the user accepted via the key operation unit 70, the control unit 10 reads the specified program and allows the CPU 11 to execute the program, and then supplies voice data generated accordingly to the voice decoder 31 and video data to the video decoder 41. Accordingly, the voice and pictures obtained by executing the program can be provided to the user through the speaker/headphone 32 and the LCD 42.

Additionally, in the communication terminal apparatus 100 according to the first embodiment, when the power thereof is turned on and some content is being used therein, the apparatus 100 captures biometric information at every predetermined timing via the biometric information sensor 21 and the biometric information encoder 22, captures exercise information via the exercise information sensor 23 and the exercise information encoder 24, generates history information of state information of the user in which the biometric information and exercise information are associated with identification information (content ID) of content data that is being used, and accumulates the history information in the nonvolatile memory 14, for example.

FIG. 3 illustrates a history of state information of the user accumulated in the nonvolatile memory 14 of the communication terminal apparatus 100 according to the first embodiment. As illustrated in FIG. 3, the history of state information of the user includes acquisition time when the control unit 10 obtained biometric information and exercise information, the acquisition time being obtained from the clock circuit 15. Also, the history includes biometric information obtained via the biometric information sensor 21, including pulses, heartbeats, a body temperature, a myoelectric potential, brain waves, a sweating state, and the diameter of a pupil; exercise information including an exercise tempo and information indicating an exercise state; and a content ID of the content data being used at that time.

As described above, biometric information including pulses, heartbeats, a body temperature, a myoelectric potential, brain waves, a sweating state, and the diameter of a pupil is information obtained via the biometric information sensor 21. Specifically, the biometric information sensor 21 includes various sensors. For example, pulses and a body temperature can be detected by a pressure sensor and a body temperature sensor attached to an earlobe of the user, and heartbeats can be detected based on an electrocardiogram detected via an electrode attached to the breast of the user. Typically, one of pulses and heartbeats may be used. Also, a myoelectric potential can be detected by attaching an electrode to an arm or a leg and measuring the myoelectric potential via the electrode. Brain waves can also be detected via some electrodes attached to the head.

A level of sweating can be detected, that is, whether a sweating level is high, moderate, or low can be detected by checking magnitude of flown current by means of an electrode attached on a skin surface at a predetermined position of the body of the user. Also, the diameter of a pupil can be detected by targeting the pupil of an eye of the user by a compact camera attached to eyeglasses or sunglasses and measuring the size (diameter) thereof.

Although a case where a very typical biometric information sensor is used has been described above, the present invention is not limited to this. Various pieces of biometric information can be measured very easily by using a very compact multifunction sensor. For example, only by allowing a user to put a ring mounted with various compact sensors, respective pieces of biometric information including pulses, heartbeats, a body temperature, a myoelectric potential, brain waves, and sweating can be detected.

As described above, a walking tempo and an exercise state as exercise information can be obtained by analyzing a detection output from the triaxial acceleration sensor serving as an exercise information sensor. Also, a content ID of content being reproduced is recognized by the control unit 10 and is thus the content ID is used. In this way, when the communication terminal apparatus according to the first embodiment is being used, the history of state information of the user illustrated in FIG. 3 is obtained at appropriate timing and is accumulated in the nonvolatile memory 14.

Then, when the user of the communication terminal apparatus 100 according to the first embodiment wants recommendation of music data that matches his/her current psychological state from another communication terminal apparatus, the user performs a predetermined operation on the key operation unit 70. Accordingly, the control unit 10 generates a content data recommendation request by using the latest biometric information and exercise information obtained via the biometric information sensor 21, the biometric information encoder 22, the exercise information sensor 23, and the exercise information encoder 24, or by using the biometric information and exercise information in the latest history of state information recorded in the nonvolatile memory 14. Then, the control unit 10 transmits the request to the network 200 via the transmitting/receiving circuit 61 and the transmitting/receiving antenna 62, so that the request is transmitted to each of the communication terminal apparatuses accessible to the network 200.

Here, the content data recommendation request includes information indicating a content data recommendation request, identification information of the communication terminal apparatus 100 as a requesting source (terminal ID of the terminal as a requesting source), biometric information, exercise information, and an extraction condition. Here, the extraction condition includes, for example, information indicating ranges of pulses, heartbeats, a body temperature, a myoelectric potential, and the diameter of a pupil as the biometric information, information indicating the similarity in radio waves and a sweating state, information indicating a range of a walking tempo as the exercise information, and information indicating the similarity in an exercise state.

Note that the extraction condition need not be set for all the pieces of biometric information and exercise information. The extraction condition can be of course set by using only necessary information, for example, only pulses in the biometric information can be used as an extraction condition, or only a walking tempo in the exercise information can be used as an extraction condition.

Also, the extraction condition can include past information. For example, an exercise tempo is focused on: (1) exercise tempos are the same; (2) exercise tempos match in a predetermined range; (3) exercise tempos match previously and at the present; and (4) previous exercise tempos match in a predetermined range and current exercise tempos match in a predetermined range. In this way, not only the current state but also the past state can be included in the condition. Also, as described above, a condition such as (5) a plurality of pieces of biometric information match; and (6) part of a plurality of biometric information match, can be set.

Then, the content data recommendation request is transmitted to all the communication terminal apparatuses accessible to the network 200 through the network 200. That is, the content data recommendation request is transmitted to the respective communication terminal apparatuses through the network 200 in a so-called broadcast manner.

The communication terminal apparatus 100 that has received the content data recommendation request extracts the biometric information, exercise information, and extraction condition included in the received content data recommendation request, compares the extracted biometric information and exercise information with the biometric information and exercise information in the history of state information accumulated in the nonvolatile memory 14 of the own apparatus, extracts a history of state information that matches the extraction condition, and transmits the history to the communication terminal apparatus 100 as a source of the content data recommendation request.

FIG. 4 illustrates an example of associated information (provided information) that is transmitted from the communication terminal apparatus 100 that has received the content data recommendation request and that has history information matching the extraction condition included in the recommendation request to the communication terminal apparatus 100 as a transmission source of the content data recommendation request and that is accumulated in the associated information DB 82 of the communication terminal apparatus 100.

As illustrated in FIG. 4, the associated information (provided information) includes biometric information and exercise information, as the history of state information, and also includes a content ID of content data that was being used when the biometric information and exercise information were detected and an apparatus ID of the communication terminal apparatus as a transmission source.

Also, the pieces of associated information (provided information) illustrated in FIG. 4 are transmitted from the communication terminal apparatuses having a corresponding history when the biometric information included in the content data recommendation request indicates: pulses or heartbeats is "80/minute"; a body temperature is "36.2° C."; a myoelectric potential is "X mA"; brain waves is "β"; sweating is "high"; the diameter of a pupil is "X mm"; a walking tempo is "150 bpm"; and an exercise state is "running", and when the extraction condition indicates extraction of: pulses or heartbeats of "±5/minute"; a body temperature of "±0.5° C."; a myoelectric potential of "±0.5 mA"; the diameter of a pupil of "±2 mm"; and brainwaves and a sweating state of "the same", and a walking tempo of "±10 bpm" and an exercise state of "the same" in the exercise information.

That is, the pieces of associated information illustrated in FIG. 4 are those transmitted from the communication terminal apparatuses that have a history of state information including the biometric information and exercise information matching the above-described extraction condition between the biometric information and exercise information included in the above-described content data recommendation request and that have apparatus IDs of "aaa" and "bbb", respectively.

In this way, pieces of associated information each including biometric information, exercise information, a content ID, a terminal ID (a terminal ID of the terminal as an information providing source) are transmitted from the respective communication terminal apparatuses having a history of state information including biometric information and exercise information according to the biometric information, exercise information, and extraction condition included in the recommendation request. Thus, by sequentially receiving the pieces of associated information and accumulating them in the associated information DB 82, the communication terminal apparatus 100 as a transmission source of the recommendation information can accumulate the pieces of associated information from the respective communication terminal apparatuses and use them in the apparatus.

Then, the communication terminal apparatus 100 that has received the pieces of associated information in response to the recommendation request analyzes the pieces of associated information accumulated in the associated information DB 82 of the apparatus. For example, if there are a plurality of users of other communication terminal apparatuses who are performing exercise at a walking tempo of the same level and if a plurality of users among the users are using the same music data by reproducing it, the music data can be presented (recommended) to the user of the communication terminal apparatus 100.

Also, the communication terminal apparatus 100 that has received the pieces of associated information in response to the recommendation request analyzes the pieces of associated information accumulated in the associated information DB 82 of the apparatus. For example, if there are a plurality of users of other communication terminal apparatuses who are performing exercise at a walking tempo of the same level, the existence of those users can be presented and communication can be performed among those users.

FIG. 5 illustrates examples of display to notify the user of the communication terminal apparatus 100 of information obtained from the pieces of associated information accumulated in the associated information DB 82 of the communication terminal apparatus 100.

As described above, if it can be determined from the information in the associated information DB 82 that there are a plurality of users of other communication terminal apparatuses who are performing exercise at a walking tempo of the same level and that a plurality of users among the users are using the same music data by reproducing it, the number of users (m people) of the other communication terminal apparatuses who are running at the same walking tempo and an artist name (xxx) and a song name (A) of the music data that is listened to by the majority of them are presented as illustrated in FIG. 5A, so that song A can be recommended based on determination from the walking tempo that song A is music data matching the psychological state of the user of the communication terminal apparatus 100.

Also, as described above, if there are a plurality of users of other communication terminal apparatuses who are performing exercise at a walking tempo of the same level, the existence of those users are presented by displaying terminal IDs or the like as illustrated in FIG. 5B, selection input of whether communication is to be performed with those users is accepted, so that communication with a specified user can be performed or text data can be transmitted/received.

Additionally, in the first embodiment, a terminal ID can be used to specify the communication terminal apparatus having the terminal ID, to transmit information, and to perform communication by connection to a communication line. Of course, another identification ID, such as an e-mail address or a telephone number, can be used instead of the terminal ID.

The associated information described with reference to FIG. 4 includes biometric information, exercise information, a content ID, and a terminal ID. However, the present invention is not limited to this. Alternatively, associated information including biometric information, exercise information, and a content ID may be generated and transmitted at the time of a content data recommendation request, whereas associated information including biometric information, exercise information, and an apparatus ID may be generated and transmitted at the time of a user introduction request. Also, in response to a content data recommendation request, content data to be introduced or a digest version of the content data may be provided instead of the associated information.

[Summary of Operation of Communication Terminal Apparatus 100]

Figure 6:
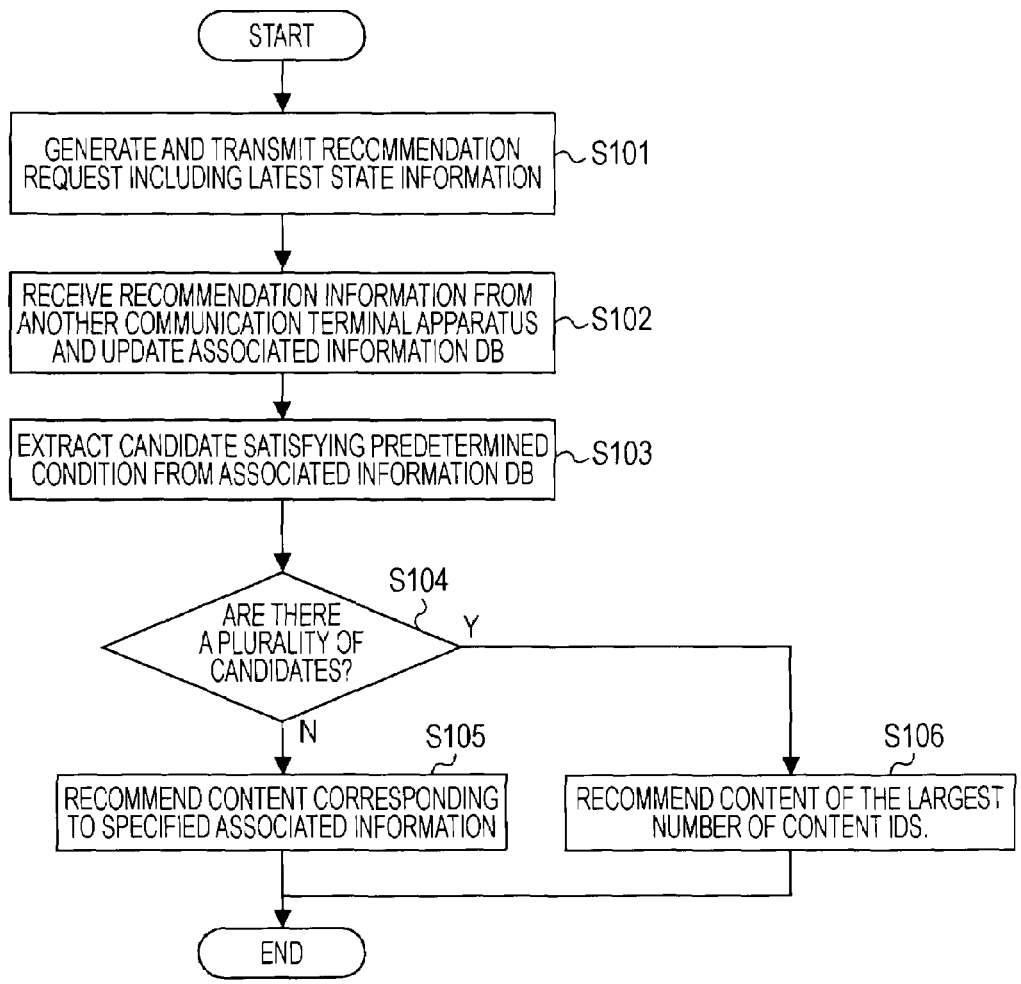
FIG. 6 is a flowchart illustrating an operation of a communication terminal apparatus to transmit a content data recommendation request.
Figure 7:
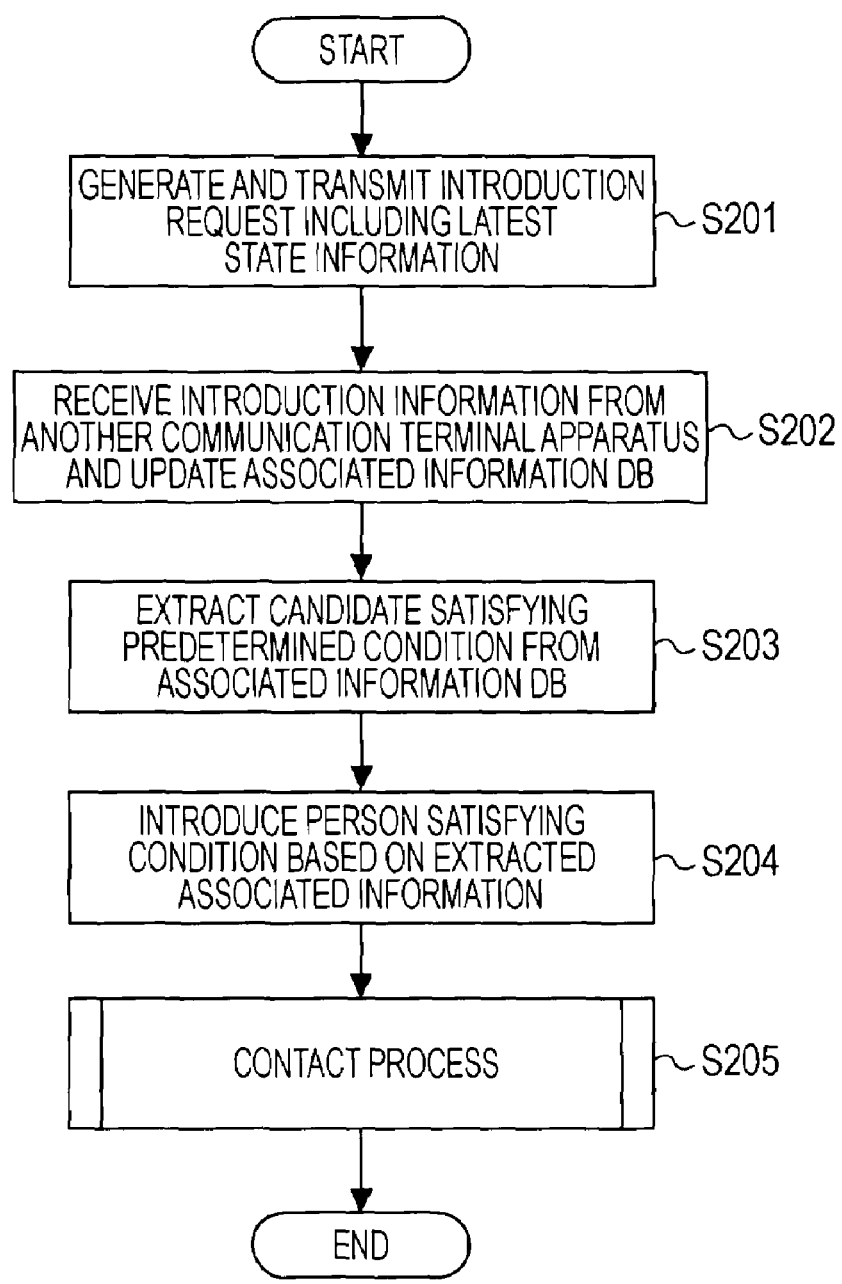
FIG. 7 is a flowchart illustrating an operation of a communication terminal apparatus to transmit a user introduction request.
Figure 8:
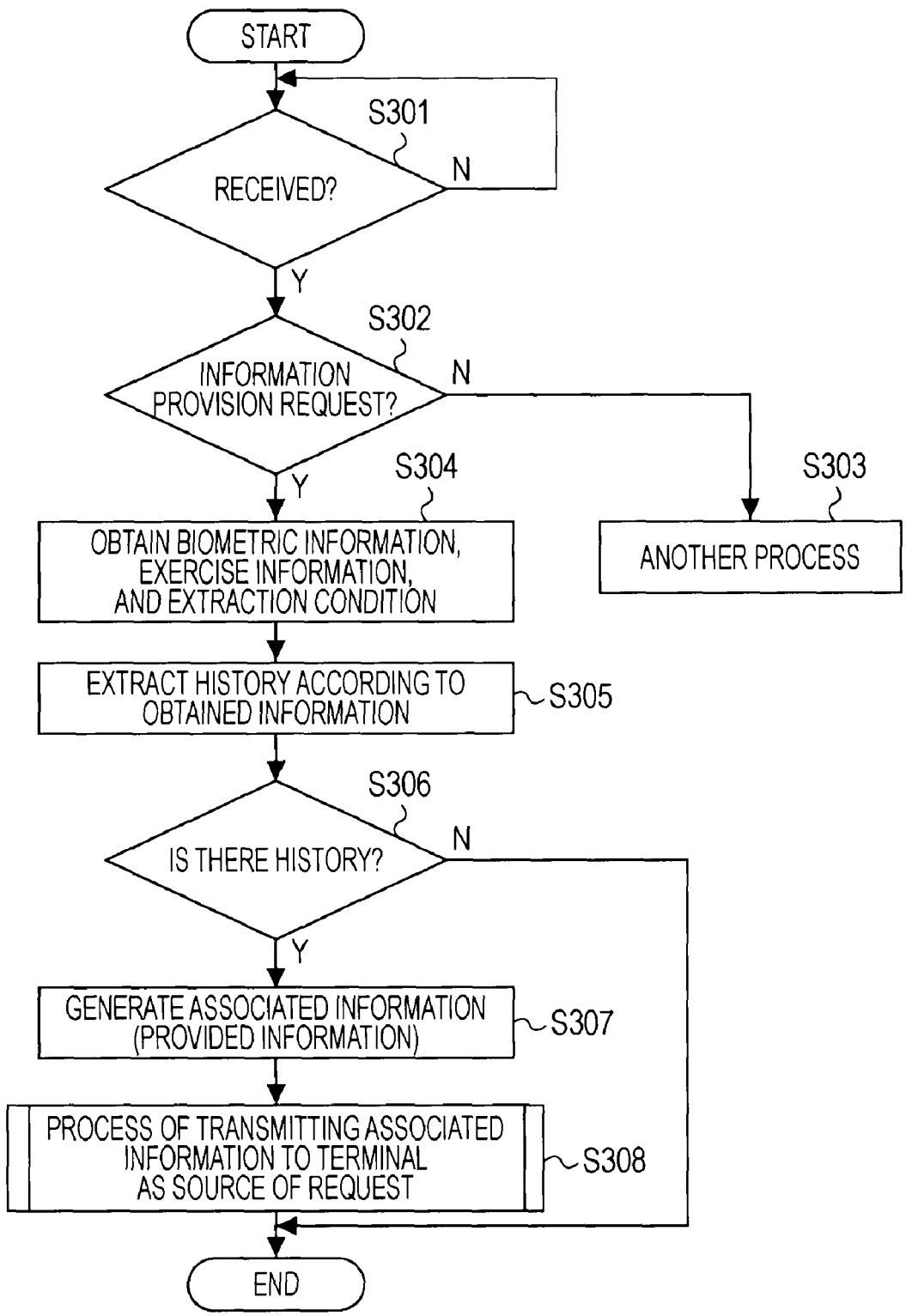
FIG. 8 is a flowchart illustrating a process in a communication terminal apparatus to receive an information provision request.

Now, an operation of the communication terminal apparatus 100 according to the first embodiment is summarized with reference to the flowcharts in FIGS. 6 to 8. Hereinafter, an operation of a communication terminal apparatus to transmit a content data recommendation request is described first, then an operation of a communication terminal apparatus to transmit a user introduction request is described, and finally an operation of a communication terminal apparatus to receive an information provision request, such as a recommendation request or an introduction request, is described.

[About Operation of Communication Terminal Apparatus to Transmit Content Data Recommendation Request]

FIG. 6 is a flowchart illustrating an operation of a communication terminal apparatus to transmit a content data recommendation request. As described above, the control unit 10 of the communication terminal apparatus 100 according to the first embodiment receives input of instructions to transmit a content data recommendation request via the key operation unit 70 and then performs the process of the flowchart illustrated in FIG. 6.

First, the control unit 10 detects state information including the latest biometric information and exercise information via the biometric information sensor 21, the biometric information encoder 22, the exercise information sensor 23, and the exercise information encoder 24, generates a content data recommendation request including the detected state information, and transmits the request to the network 200 via the transmitting/receiving circuit 61 and the transmitting/receiving antenna 62 (step S101).

Incidentally, the latest biometric information and exercise information are newly obtained here, but the present invention is not limited to this. For example, if a history of state information of a user described with reference to FIG. 3 is frequently detected and accumulated, the recommendation request may be generated by using the latest information of the history. Additionally, the recommendation request generated in the process of step S101 includes information indicating a content data recommendation request, a terminal ID of the communication terminal apparatus as a transmission source, state information (biometric information and exercise information), and an extraction condition, as described above.

Then, the control unit 10 of the communication terminal apparatus 100 that has transmitted the content data recommendation request receives recommendation information transmitted from one or more communication terminal apparatuses in response to the recommendation request transmitted by the apparatus, and updates the associated information DB 82 based on the recommendation information (step S102). The recommendation information can be transmitted from a plurality of communication terminal apparatuses having information to be transmitted as recommendation information. Thus, in step S102, recommendation information from all the communication terminal apparatuses that have transmitted the recommendation information is received and a process of updating information is performed on the associated information DB 82.

Then, the control unit 10 of the communication terminal apparatus 100 that has transmitted the content data recommendation request extracts a candidate satisfying a predetermined condition from the associated information DB 82 in accordance with the extraction condition included in the recommendation request, considering that various pieces of information are accumulated in the associated information DB 82 (step S103).

Based on a result of the extracting process in step S103, the control unit 10 of the communication terminal apparatus 100 determines whether a plurality of candidates exist (step S104). If the control unit 10 determines in the determining process in step S104 that only one candidate exists, there is only a piece of extracted associated information to become a candidate, and thus the content of the content ID included in the associated information is recommended (step S105), and the process illustrated in FIG. 6 ends.

On the other hand, if the control unit 10 determines in the determining process in step S104 that a plurality of candidates exist, there are a plurality of pieces of associated information to become candidates, and thus the content of the largest number of content IDs in the content IDs included in the pieces of associated information is recommended (step S106), and the process illustrated in FIG. 6 ends.

Incidentally, step S106 is an example of a processing method in a case where a plurality of candidates exist, and another method may be used. For example, when a plurality of candidates exist, the number of candidates or pieces of associated information may be counted in units of content IDs and content may be recommended in order from the largest number of content IDs. Alternatively, each of the plurality of candidates may be recommended, or a favorite artist of the user of the communication terminal apparatus may be recognized in advance and content may be extracted and recommended in accordance with the favorite.

Also, in the process illustrated in FIG. 6, information satisfying the extraction condition is extracted in step S103 considering that previously obtained information is also held in the associated information DB 82, but the present invention is not limited to this. If the information stored in the associated information DB 82 is cleared when an information provision request is newly transmitted, only data transmitted in response to the newly transmitted information provision request can be stored in the associated information DB 82. In that case, the process in step S103 illustrated in FIG. 6 can be omitted.

By performing the process illustrated in FIG. 6, the content data that the user was using or that was used in another communication terminal apparatus when the biometric information and exercise information of the user are/were in the same or similar state can be recommended. Biometric information and exercise information of each user may change due to an effect of a psychological state of the user, and are processed so as to appropriately recommend content data according to the psychological state of the user and to enable the user to use the content data.

[About Operation of Communication Terminal Apparatus to Transmit User Introduction Request]

FIG. 7 is a flowchart illustrating an operation of a communication terminal apparatus to transmit a user introduction request. The control unit 10 of the communication terminal apparatus 100 according to the first embodiment receives input of instructions to transmit a user introduction request via the key operation unit 70 and then performs the process of the flowchart illustrated in FIG. 7.

First, the control unit 10 detects state information including the latest biometric information and exercise information via the biometric information sensor 21, the biometric information encoder 22, the exercise information sensor 23, and the exercise information encoder 24, generates a user introduction request including the detected state information, and transmits the request to the network 200 via the transmitting/receiving circuit 61 and the transmitting/receiving antenna 62 (step S201).

In this case, as in the process in step S101 illustrated in FIG. 6, if the history of state information of the user described with reference to FIG. 3 is frequently detected and is accumulated, the introduction request may be generated by using the latest information of the history.

Also, the introduction request generated in the process in step S201 includes information indicating a user introduction request, a terminal ID of a communication terminal apparatus as a transmission source, state information (biometric information and exercise information) and an extraction condition. Here, the extraction condition indicates a range or similarity of biometric information and exercise information, as in the case of the extraction condition included in the above-described content data recommendation request, and it is set that pulses and a walking tempo are at the same level, for example, "15".

Then, the control unit 10 of the communication terminal apparatus 100 that has transmitted the user introduction request receives introduction information transmitted from one or more other communication terminal apparatuses in response to the introduction request transmitted by the apparatus, and updates the associated information DB 82 based on the introduction information (step S202). The introduction information can be transmitted from a plurality of communication terminal apparatuses having information to be transmitted as introduction information. Thus, in step S202, introduction information from all the communication terminal apparatuses that have transmitted the introduction information to the apparatus is received and a process of updating information is performed on the associated information DB 82.

Then, the control unit 10 of the communication terminal apparatus 100 that has transmitted the user introduction request extracts a candidate satisfying a predetermined condition from the associated information DB 82 in accordance with the extraction condition included in the introduction request, considering that various pieces of information are accumulated in the associated information DB 82 (step S203).

Then, the control unit 10 of the communication terminal apparatus 100 introduces (presents) a user of another communication terminal apparatus who satisfies the extraction condition in the relationship with the biometric information and exercise information of the user of the communication terminal apparatus 100 that has transmitted the user introduction request to the user of the communication terminal apparatus 100 based on the associated information extracted to become a candidate (step S204).

Then, the user of the communication terminal apparatus 100 that has transmitted the introduction request performs a process of contacting the user of another communication terminal apparatus so as to communicate with the selected user (step S205), and then the process illustrated in FIG. 7 ends.

Also, in the process illustrated in FIG. 7, information satisfying the extraction condition is extracted in step S203 considering that previously obtained information is also held in the associated information DB 82, but the present invention is not limited to this. If the information stored in the associated information DB 82 is cleared when an information provision request is newly transmitted, only data transmitted in response to the newly transmitted information provision request can be stored in the associated information DB 82. In that case, the process in step S203 illustrated in FIG. 7 can be omitted.

By performing the process illustrated in FIG. 7, a user of another communication terminal apparatus whose biometric information and exercise information are in the same or similar state as that of the user can be introduced. Thus, a new communication tool enabling users who are jogging at a similar walking tempo and having the same level of pulses and sweating state to encourage each other or to give an advice to each other can be provided.

[About Operation of Communication Terminal Apparatus to Receive Information Provision Request]

Next, an operation of a communication terminal apparatus that has received an information provision request, such as a content data recommendation request or a user introduction request, is described. FIG. 8 is a flowchart illustrating a process in the communication terminal apparatus to receive an information provision request.

In the system according to the first embodiment illustrated in FIG. 1, when the communication terminal apparatuses 100 according to the first embodiment accessible to the network 200 among the communication terminal apparatuses other than the communication terminal apparatus that has transmitted a content data recommendation request or a user introduction request are in a so-called standby state, the control unit 10 of the communication terminal apparatus 100 performs the process illustrated in FIG. 8.

Then, the control unit 10 is brought into a standby state to receive reception data to the apparatus via the transmitting/receiving antenna 62 and the transmitting/receiving circuit 61 (step S301). If the control unit 10 determines in the determining process in step S301 that reception data to the apparatus has been received via the transmitting/receiving antenna 62 and the transmitting/receiving circuit 61, the control unit 10 determines whether the reception data is an information provision request, such as a recommendation request or an introduction request (step S302).

If the control unit 10 determines in the determining process in step S302 that the reception data is not an information provision request, another process according to the reception data is performed (step S303). For example, if the reception data is notification information, control information, or the like, the reception data is taken in and is stored in a memory or a process according to the reception data is performed.

If the control unit 10 determines in the determining process in step S302 that the reception data is an information provision request, the control unit 10 obtains biometric information, exercise information, and an extraction condition included in the reception data (step S304). Then, the control unit 10 refers to the history of state information accumulated in the own nonvolatile memory 14 and extracts history information according to the information obtained in step S304 (step S305).

Specifically, in step S305, a process of extracting history information of state information including biometric information and exercise information matching the obtained extraction condition is performed for the biometric information and exercise information of the user of the communication terminal apparatus as a requesting source obtained in step S304.

Then, the control unit 10 of the communication terminal apparatus 100 that has received the information provision request determines whether history information according to the biometric information, exercise information, and extraction condition included in the received information provision request has been extracted from the history of state information held in the communication terminal apparatus 100 based on the extraction result obtained in step S305 (step S306).

If the control unit 10 determines in the determining process in step S306 that history information has been extracted, the control unit 10 generates associated information (provided information) to be provided based on the extracted history information (step S307). Specifically, when the received information provision request is a content data recommendation request, associated information (provided information) including information indicating the other end of communication (e.g., a terminal ID of the other end of communication) and biometric information, exercise information, and a content ID included in the extracted history information is generated. On the other hand, when the received information provision request is a user recommendation request, associated information (provided information) including information indicating the other end of communication (e.g., a terminal ID of the other end of communication) and biometric information, exercise information, and a terminal ID of the apparatus included in the extracted history information is generated.

Then, the control unit 10 of the communication terminal apparatus 100 that has received the information provision request controls the transmitting/receiving circuit 61 in order to perform a process of transmitting the associated information (provided information) generated in step S307 to the communication terminal apparatus as a transmission source of the information provision request (a process of transmitting associated information in response to the information provision request) in step S308, and the process illustrated in FIG. 8 ends.

On the other hand, if the control unit 10 determines in the determining process in step S306 that history information has not been extracted (there is no history information to be extracted), no information to be transmitted exists, and thus the process illustrated in FIG. 8 ends without doing anything.

As described above, the communication terminal apparatus other than the communication terminal apparatus that has transmitted an information provision request, such as a content data recommendation request or a user introduction request, receives the information provision request. Then, if information to be transmitted based on the biometric information, exercise information, and extraction condition included in the information provision request exists, the communication terminal apparatus can transmit the information to be transmitted to the communication terminal apparatus as a requesting source.

As described above, in the system according to the first embodiment illustrated in FIG. 1, each of the communication terminal apparatuses 100(1), 100(2), 100(3), . . . , and 100(*n*) has a function as a communication terminal apparatus capable of transmitting an information provision request and receiving provision of information, and also has a function as a communication terminal apparatus capable of providing information to be transmitted in response to an information provision request if any when receiving the information provision request from another apparatus.

Accordingly, users of the respective communication terminal apparatuses can receive recommendation of content data according to their psychological states based on their biometric information and exercise information and can receive introduction of a user of another communication terminal apparatus according to their psychological and physical states.

Incidentally, it is possible that even a user of a communication terminal apparatus constituting the system according to the first embodiment does not want to provide information about content data that was reproduced by him/her or does not want to be introduced as a user having psychological and physical states similar to the psychological and physical states of the user as a requesting source.

In view of such a case, setting can be made on the communication terminal apparatus so as not to respond to a content data recommendation request or setting can be made on the communication terminal apparatus so as not to respond to a user introduction request. Accordingly, the user need not respond to a content data recommendation request or a user introduction request even if he/she receives the request.

Also, in the above-described first embodiment, the communication terminal apparatus that has transmitted a content data recommendation request extracts a piece of associated information that matches the biometric information and exercise information of the user of the apparatus and the extraction condition from among pieces of associated information received from another communication terminal apparatus and stored in the associated information DB 82 of the apparatus, and recommends content based on the content ID included in the associated information. However, the present invention is not limited to this.

For example, as described with reference to FIG. 3, the history of state information that is accumulated in the nonvolatile memory 14 and that includes biometric information, exercise information, and a content ID may also be considered. That is, the information stored in the associated information DB 82 and the history of state information accumulated in the nonvolatile memory 14 may be regarded as a target of search, associated information that matches the biometric information, exercise information, and extraction condition of the user of the apparatus or the history information of the state information may be extracted, and content may be recommended based on the content ID included in the information.

Also, the associated information DB and/or the history of state information accumulated in the nonvolatile memory 14 may be regarded as a target of search so as to extract information that matches the biometric information and exercise information of the user of the apparatus and the extraction condition first. Then, if the information cannot be extracted, a content data recommendation request may be generated and transmitted to the network 200.

Note that the above description has been made based on the assumption that, when the communication terminal apparatus 100 according to the first embodiment receives a content data recommendation request or a user introduction request, the communication terminal apparatus 100 extracts matching information from the history of state information accumulated in the nonvolatile memory 14 based on the biometric information, exercise information, and extraction condition included in the information provision request. However, the present invention is not limited to this.

If associated information provided from another communication terminal apparatus has already been accumulated in the associated information DB 82, the information accumulated in the associated information DB 82 can also be regarded as a target of search for information to be extracted based on the biometric information, exercise information, and extraction condition. That is, since the associated information DB 82 is basically information of another communication terminal apparatus provided from another communication terminal apparatus, the information of the own apparatus accumulated in the nonvolatile memory 14 and the information of another apparatus accumulated in the associated information DB 82 can be regarded as a target of search for provided information.

When content data is to be recommended, the artist name and content name (e.g., song name) of the recommended content may not be presented, as described above. When the recommended content data exists in the content DB of the own apparatus, the content data therein may be reproduced. Alternatively, when content data or a digest version of content data is provided instead of a content ID, the content data or the digest version may be reproduced.

Second Embodiment

In the above-described first embodiment, provision of information is performed between communication terminal apparatuses. That is, in the system according to the first embodiment, the communication terminal apparatus transmitted an information provision request receives provision of information directly from each communication terminal apparatus. However, the apparatus needs to receive transmitted associated information from a plurality of communication terminal apparatuses respectively, and thus time may be required to collect associated information or load of the communication process may become large.

Accordingly, in the second embodiment, a server apparatus to receive provision of histories of state information from respective communication terminals and to manage the histories as associated information is provided on the Internet, and each of the communication terminal apparatuses transmits a content data recommendation request or a user introduction request only to the server apparatus, so that provision of necessary information can be received from the server apparatus.

Figure 9:
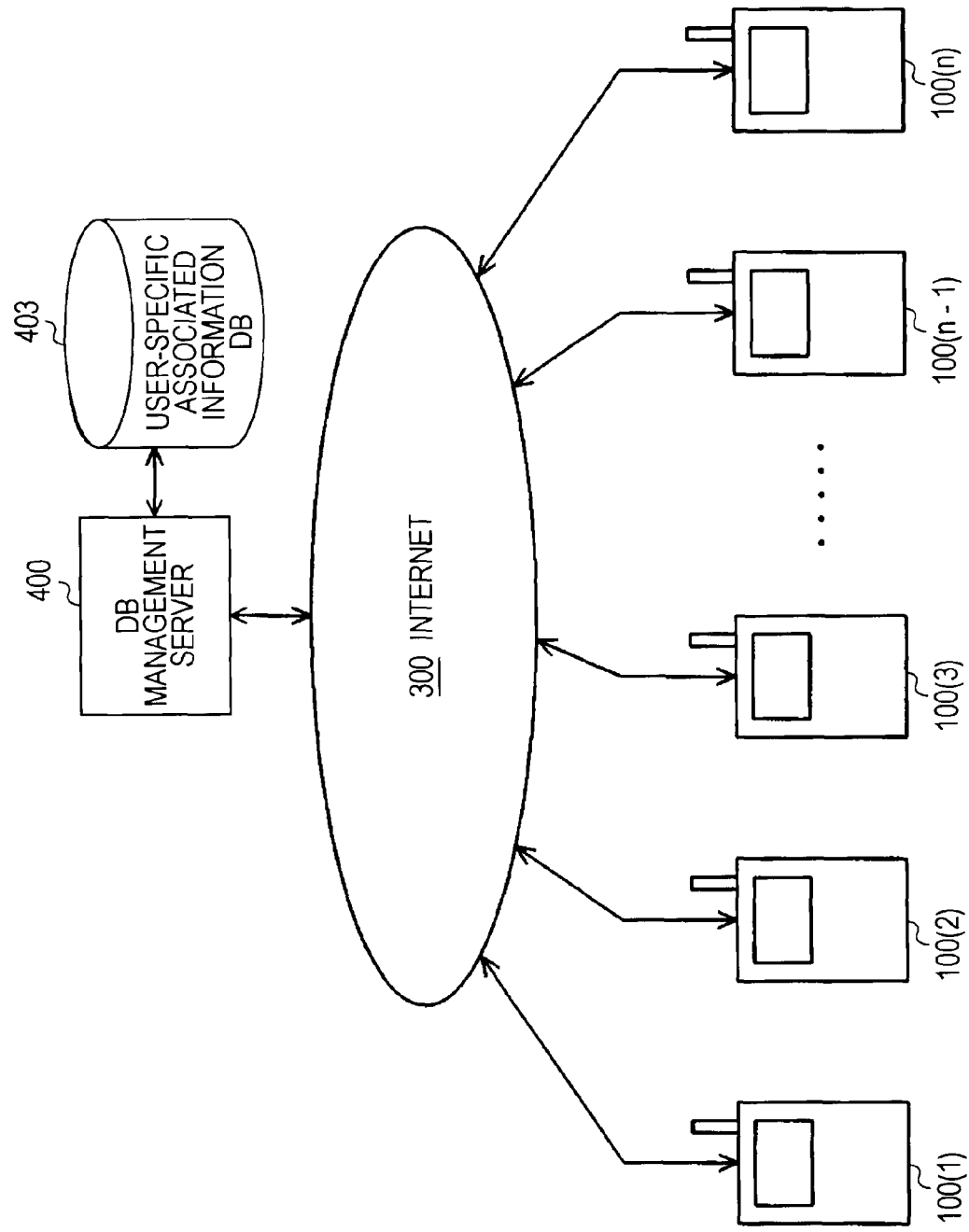
FIG. 9 illustrates a communication system according to a second embodiment to which an embodiment of an information providing system according to the present invention is applied.

FIG. 9 illustrates a communication system according to the second embodiment that is established by applying an embodiment of the information providing system according to the present invention. As illustrated in FIG. 9, the communication system according to the second embodiment includes a plurality of communication terminal apparatuses 100(1), 100(2), 100(3), . . . , and 100(n) and a database management server apparatus (hereinafter refereed to as a DB management server) 400 that are mutually connected via a wideband network 300.

In the second embodiment, the wideband network 300 is the Internet. Each of the communication terminal apparatuses 100(1), 100(2), 100(3), . . . , and 100(n) is configured to be capable of accessing to the Internet 300 via a mobile phone network or a radio LAN, for example.

In the second embodiment, each of the communication terminal apparatuses 100(1), 100(2), 100(3), . . . , and 100(n) is applied with an embodiment of the apparatus, method, and program according to the present invention, and has the same configuration as that of the communication terminal apparatus 100 according to the first embodiment described with reference to FIG. 2. Thus, descriptions will be made with reference to also FIG. 2 as necessary in the second embodiment.

As the communication terminal apparatus according to the above-described first embodiment, each of the communication terminal apparatuses 100(1), 100(2), 100(3), . . . , and 100(n) captures biometric information via the biometric information sensor 21 and the biometric information encoder 22 or exercise information via the exercise information sensor 23 and the exercise information encoder 24 at every predetermined timing, generates history information of state information of a user by associating the biometric and exercise information with identification information of content (content ID) that is being used, and accumulates the history information in the nonvolatile memory 14 while the power is turned on and some content is being used.

Also, each of the communication terminal apparatuses 100(1), 100(2), 100(3), . . . , and 100(*n*) according to the second embodiment is capable of accessing the Internet 300 via the communication I/F 50 and transmitting the history of state information accumulated in the nonvolatile memory 14 to the DB management server 400 provided on the Internet 300 at every predetermined timing. As described below, the DB management server 400 is capable of storing and holding histories of state information transmitted from the respective communication terminal apparatuses 100(1), 100(2), 100(3), . . . , and 100(*n*) and managing the histories in units of communication terminal apparatuses.

The DB management server 400 is capable of, as a basic function, receiving provision of histories of state information from the respective communication terminal apparatuses 100(1), 100(2), 100(3), . . . , and 100(*n*) and managing the histories in units of communication terminal apparatuses, and is also capable of extracting information to be provided from the histories of state information of the respective communication terminal apparatuses managed thereby and transmitting the extracted information to the communication terminal apparatus as a requesting source when receiving a content data recommendation request or a user introduction request.

Figure 10:
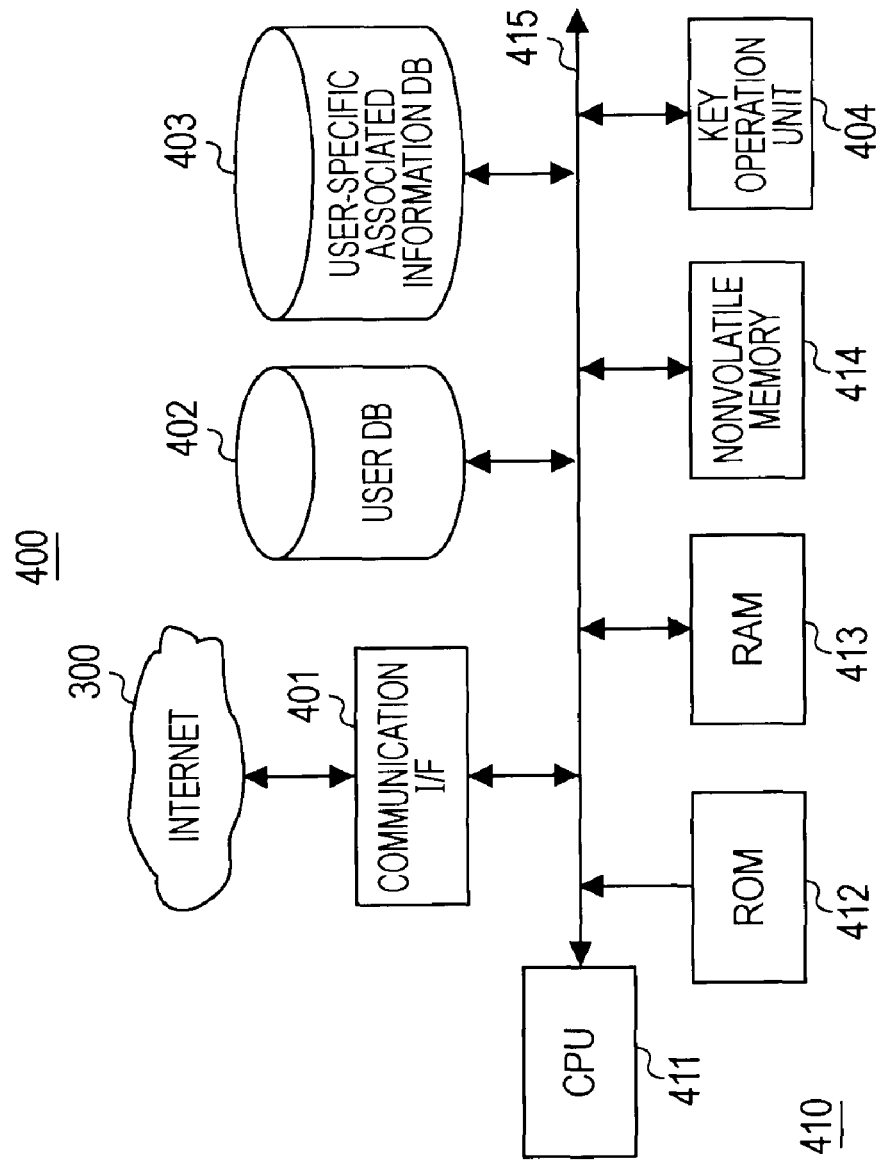
FIG. 10 is a block diagram illustrating a DB management server 400.

FIG. 10 is a block diagram illustrating the DB management server 400 used in the second embodiment. As illustrated in FIG. 10, the DB management server 400 includes a communication interface (hereinafter refereed to as a communication I/F) 401, a user database (hereinafter referred to as a user DB) 402, a user-specific associated information database (hereinafter referred to as a user-specific associated information DB) 403, and a key operation unit 404, which are connected to a control unit 410.

As illustrated in FIG. 10, the control unit 410 is a microcomputer including a CPU 411, a ROM 412, a RAM 413, and a nonvolatile memory 414, which are mutually connected through a CPU bus 415, and controls each unit of the DB management server 400 of the second embodiment.

Here, the CPU 411 performs a key role of control. The CPU 411 reads and executes a program stored and held in the ROM 412 or the nonvolatile memory 414, generates control signals to be supplied to the respective units, and supplies them to the respective related units, so as to control the respective units and to allow the respective units to perform a desired process. Also, the CPU 411 receives data from the respective units, processes the data, and records the data in a recording medium.

The ROM 412 stores and holds various data required for various programs or processes. The RAM 413 is mainly used as a work area, for example, temporarily stores a midstream result of a process. On the other hand, the nonvolatile memory 414 stores and holds data that should be held even after the power is turned off, for example, various parameters, added programs, and fixed data.

The communication I/F 401 is a part of performing a process of transmitting/receiving data by accessing the Internet 300 in cooperation with the control unit 10. Also, the user DB 402 stores and holds information about users who can use the DB management server 400.

For example, information about a user of a communication terminal apparatus closing a predetermined contract with a management company operating the DB management server 400, for example, information including a terminal ID of the communication terminal apparatus used by the user and the name and address of the user is registered in the user DB 402. Then, the information in the user DB 402 is used to determine whether a user accessed the DB management server 400 via the Internet 300 is a user who can use the DB management server 400 according to the second embodiment. In the second embodiment, a specific description about a user authenticating process in the DB management server 400 is omitted to simplify the description.

The user-specific associated information DB 403 stores and holds histories of state information described with reference to FIG. 3 transmitted from the respective communication terminal apparatuses 100(1), 100(2), 100(3), . . . , and 100(*n*) in units of communication terminal apparatuses, that is, in units of users. Thus, in the user-specific associated information DB 403, the histories of state information of users illustrated in FIG. 3 are stored, held, and managed in units of users.

Additionally, the key operation unit 404 is used by a manager of the DB management server 400 mainly to manage and operate the DB management server 400, for example, to register, change, or delete data in the user DB.

Also, as described below, based on a content data recommendation request or a user introduction request including biometric information and exercise information transmitted from each of the communication terminal apparatuses 100(1), 100(2), 100(3), . . . , and 100(*n*), the control unit 410 of the DB management server 400 extracts information to be provided from the user-specific associated information DB 403 and transmits the extracted information to the communication terminal apparatus as a requesting source via the communication I/F 401 and the Internet 300.

In this way, the communication system according to the second embodiment illustrated in FIG. 9 is configured by mutually connecting the communication terminal apparatuses 100(1), 100(2), 100(3), . . . , and 100(*n*), each having the configuration illustrated in FIG. 2, and the DB management server 400 having the configuration illustrated in FIG. 10 via the Internet 300.

Then, each of the communication terminal apparatuses 100(1), 100(2), 100(3), . . . , and 100(*n*) transmits its own history of state information to the DB management server 400 via the Internet 300. On the other hand, the DB management server 400 manages the histories of state information from the respective communication terminal apparatuses 100(1), 100(2), 100(3), . . . , and 100(*n*) in units of users.

In this way, the DB management server 400 can collectively manage the histories of state information from the respective communication terminal apparatuses 100(1), 100(2), 100(3), . . . , and 100(*n*) and can individually respond to content data recommendation requests and user introduction requests from the respective communication terminal apparatuses 100(1), 100(2), 100(3), . . . , and 100(*n*).

Thus, each of the communication terminal apparatuses 100(1), 100(2), 100(3), . . . , and 100(*n*) can receive provision of information according to the histories of state information of all the communication terminal apparatuses registered in the DB management server 400 by transmitting an information provision request to the DB management server 400.

[About Operation of Communication Terminal Apparatus 100 and Operation of DB Management Server 400]

Next, operations of the respective communication terminal apparatuses 100(1), 100(2), 100(3), . . . , and 100(*n*) and the DB management server 400 of the communication system according to the second embodiment are described with reference to the flowcharts in FIGS. 11 to 14. Hereinafter, operations of the respective communication terminal apparatuses 100(1), 100(2), 100(3), . . . , and 100(*n*) are described as an operation of the communication terminal apparatus 100 for simple description.

Also, hereinafter, (1) a process of transmitting a history of state information to the DB management server 400; (2) a process of transmitting a content data recommendation request; and (3) a process of transmitting a user introduction request are described first as the operation of the communication terminal apparatus 100. Then, the operation of the DB management server 400 is described.

[(1) About Operation of Communication Terminal Apparatus to Transmit History of State Information to DB Management Server]

Figure 11:
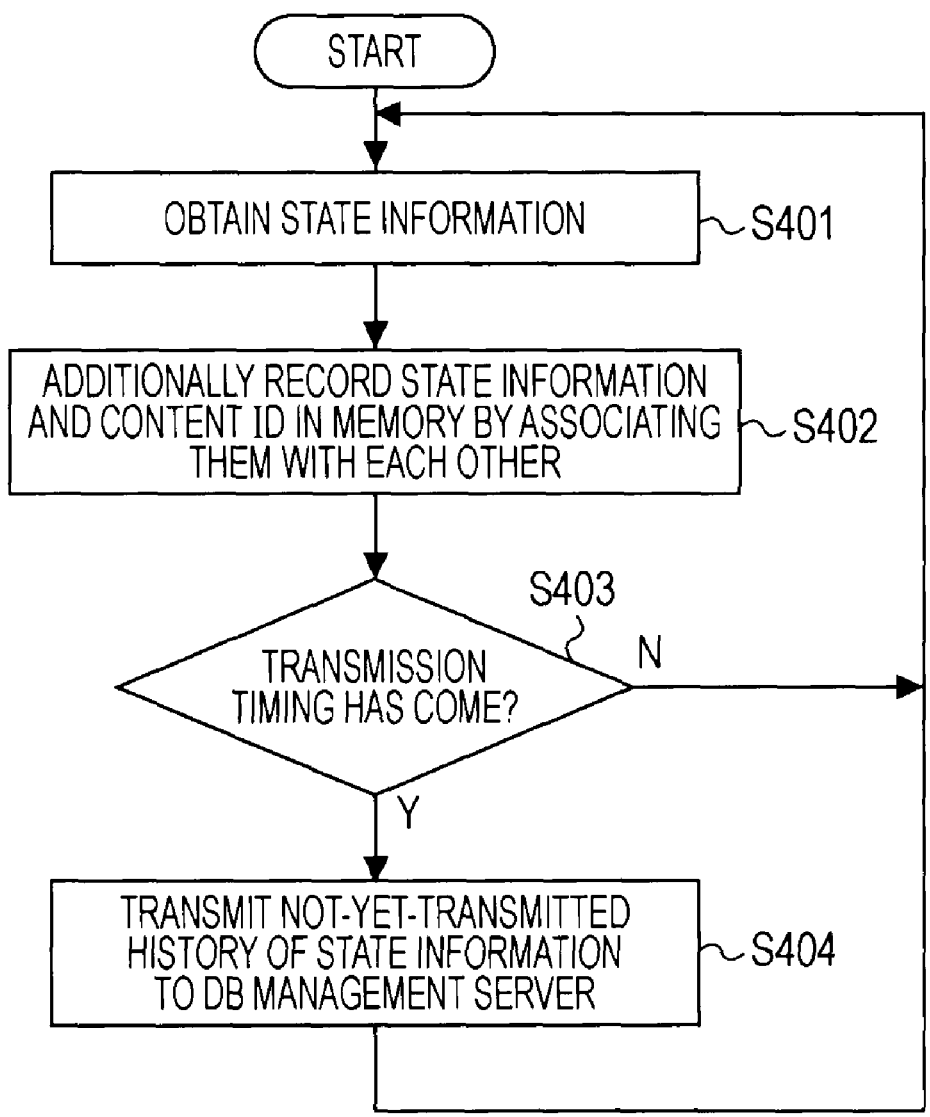
FIG. 11 is a flowchart illustrating an operation of the communication terminal apparatus 100 to transmit a history of state information to the DB management server 400.

FIG. 11 is a flowchart illustrating an operation of the communication terminal apparatus 100 to transmit a history of state information to the DB management server 400. When the power of the communication terminal apparatus 100 is turned on and some content is being used therein, the process illustrated in FIG. 11 is performed by the control unit 10.

First, the control unit 10 controls the biometric information sensor 21, the biometric information encoder 22, the exercise information sensor 23, and the exercise information encoder 24, in order to obtain biometric information and exercise information as state information of the user (step S401). In the second embodiment, too, the biometric information is information including pulses, heartbeats, a body temperature, a myoelectric potential, brain waves, a sweating state, and the diameter of a pupil, whereas the exercise information is information including a walking tempo and an exercise state, as illustrated in FIG. 3.

Then, the control unit 10 associates the state information obtained in step S401 with the content ID of the content that was being used when the state information was obtained and additionally records them as a history of state information in the nonvolatile memory 14 (step S402). By the process in step S402, the history of state information is accumulated in the nonvolatile memory 14 as illustrated in FIG. 3.

Then, the control unit 10 determines whether transmission timing of the history of state information to the DB management server 400 has come based on a predetermined determination standard (step S403). Various determination standards can be used, for example, it can be determined that transmission timing has come when the history of state information increases by a predetermined amount; it can be determined that transmission timing has come at regular time intervals; it can be determined that transmission timing has come every time reproduced content data changes; or it can be determined that transmission timing has come when the history of state information increases by a predetermined amount and when reproduced content data changes. Basically, however, the determination standard is predetermined by the side of a manufacturer of the communication terminal apparatus 100.

Then, if the control unit 10 determines in the determining process in step S403 that the transmission timing of the history of state information has not come, the process from step S401 is repeated and a process of accumulating the history of state information is repeated. On the other hand, if the control unit 10 determines in the determining process in step S403 that the transmission timing of the history of state information has come, the control unit 10 transmits a history of state information that has not been transmitted in the history of state information accumulated in the nonvolatile memory 14 to the DB management server 400 via the communication I/F 50 and the Internet 300 (step S404). Then, the process from step S401 is repeated and a process of accumulating the history of state information is repeated.

Also, in the process in step S404, transmitted information and not-yet-transmitted information can be distinguished from each other by attaching a "transmitted" flag to transmitted information in the history of state information accumulated in the nonvolatile memory 14. Also, the history of transmitted state information may be moved to another storage area of the nonvolatile memory 14 or another recording medium, and only the history of not-yet-transmitted state information may be kept in a predetermined storage area of the nonvolatile memory.

Then, the process illustrated in FIG. 11 is constantly performed and the history of state information is accumulated until the power of the communication terminal apparatus is turned off.

[About Operation of Communication Terminal Apparatus to Transmit Content Data Recommendation Request]

Figure 12:
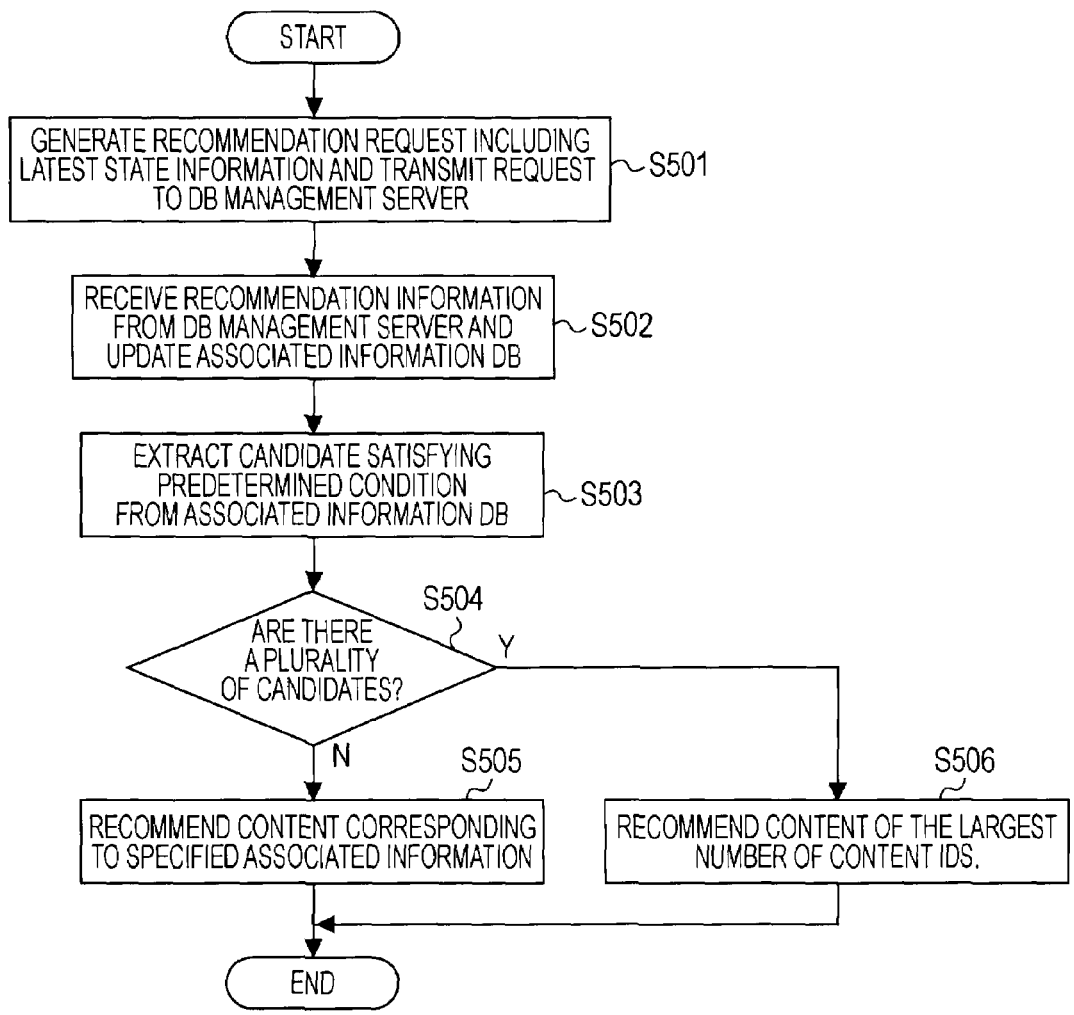
FIG. 12 is a flowchart illustrating an operation of a communication terminal apparatus to transmit a content data recommendation request to the DB management server 40.

FIG. 12 is a flowchart illustrating an operation of a communication terminal apparatus to transmit a content data recommendation request to the DB management server 40. In the second embodiment, too, the control unit 10 of the communication terminal apparatus 100 performs the process of the flowchart illustrated in FIG. 12 when accepting input of instructions to transmit a content data recommendation request via the key operation unit 70.

First, the control unit 10 detects state information including the latest biometric information and exercise information via the biometric information sensor 21, the biometric information encoder 22, the exercise information sensor 23, and the exercise information encoder 24, generates a content data recommendation request including the detected state information, and transmits the request to the DB management server 400 via the communication I/F 50 and the Internet 300 (step S501).

Note that, according to the description given here, the latest biometric information and exercise information are newly obtained, but the present invention is not limited to this. For example, when the history of state information of the user described with reference to FIG. 3 is frequently detected and accumulated, the recommendation request may be generated by using the latest information in the history. Also, in the second embodiment, too, the recommendation request generated in the process in step S101 includes information indicating a content data recommendation request, a terminal ID of the communication terminal apparatus as a transmission source, state information (biometric information and exercise information), and an extraction condition.

Then, the control unit 10 of the communication terminal apparatus 100 that has transmitted the content data recommendation request receives recommendation information transmitted from the DB management server 400 in response to the recommendation request transmitted by the apparatus, and updates the associated information DB 82 based on the recommendation information (step S502). The DB management server 400 manages the histories of state information from all the communication terminal apparatuses 100(1), 100(2), 100(3), . . . , and 100($n$) connectable to the DB management server 400 in units of users, and thus can generate the recommendation information in view of all the histories. Therefore, the communication terminal apparatus 100 as a requesting source can obtain the same recommendation information as in the case of obtaining content data recommendation information from each of all the communication terminal apparatuses 100(1), 100(2), 100(3), . . . , and 100($n$) only by communicating with the DB management server.

Then, the control unit 10 of the communication terminal apparatus 100 that has transmitted the content data recommendation request extracts a candidate satisfying a predetermined condition from the associated information DB 82 in accordance with the extraction condition included in the recommendation request, by considering that various pieces of information are accumulated in the associated information DB 82 (step S503).

The control unit 10 of the communication terminal apparatus 100 determines whether a plurality of candidates exist based on a result of the extracting process in step S503 (step S504). If the control unit 10 determines in the determining process in step S504 that not a plurality of candidates exist, there is only one piece of associated information to become a candidate is extracted, and thus content of the content ID included in the piece of associated information is recommended (step S505), and the process illustrated in FIG. 12 ends.

On the other hand, if the control unit 10 determines in the determining process in step S504 that a plurality of candidates exist, there are a plurality of pieces of associated information to become candidates, and thus content of the largest number of content IDs among the content IDs included in the plurality of pieces of associated information is recommended (step S506), and the process illustrated in FIG. 12 ends.

Incidentally, step S506 is an example of a processing method in a case where a plurality of candidates exist, as the process in step S106 illustrated in FIG. 6 according to the first embodiment, and another method may be used. For example, when a plurality of candidates exist, the number of candidates or pieces of associated information is counted in units of content IDs, and content may be recommended in order from the largest number of content IDs. Alternatively, each of a plurality of candidates may be recommended, or a favorite artist of the user of the communication terminal apparatus may be recognized in advance and content may be extracted and recommended according to the favorite.

Also, in the process illustrated in FIG. 12, information satisfying the extraction condition is extracted in step S503 considering that previously obtained information is also held in the associated information DB 82, but the present invention is not limited to this. If the information stored in the associated information DB 82 is cleared when an information provision request is newly transmitted, only data transmitted in response to the newly transmitted information provision request can be stored in the associated information DB 82. In that case, the process in step S503 illustrated in FIG. 12 can be omitted.

By performing the process illustrated in FIG. 12, the content data that the user was using or that was used in another communication terminal apparatus when the biometric information and exercise information of the user are/were in the same or similar state can be recommended. Biometric information and exercise information of each user may change due to an effect of a psychological state of the user, and are processed so as to appropriately recommend content data according to the psychological state of the user and to enable the user to use the content data. Furthermore, the communication terminal apparatus 100 as a requesting source needs to communicate with only the DB management server 400, so that time and load to collect recommendation information can be saved.

[About Operation of Communication Terminal Apparatus to Transmit User Introduction Request]

Figure 13:
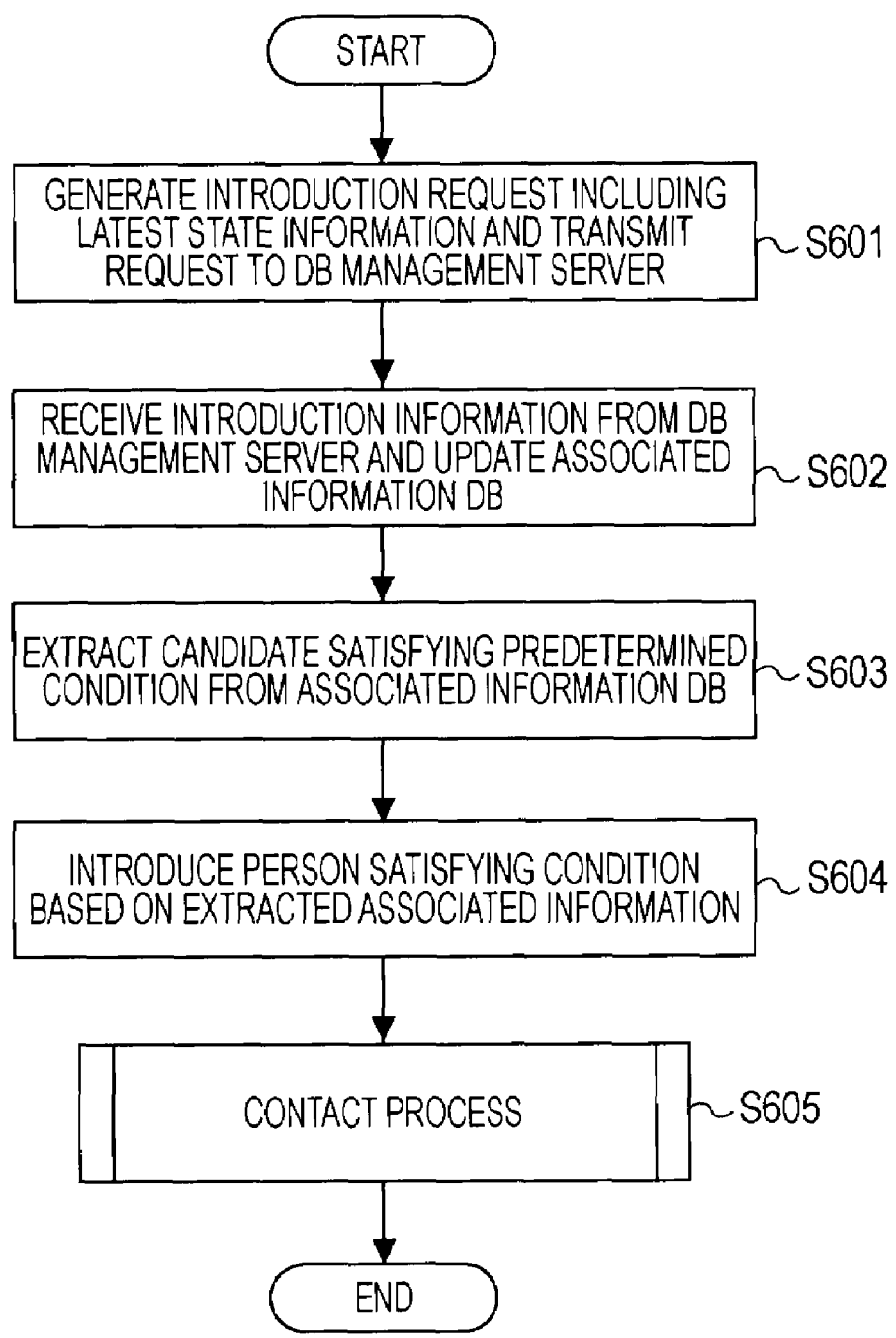
FIG. 13 is a flowchart illustrating an operation of a communication terminal apparatus to transmit a user introduction request.

FIG. 13 is a flowchart illustrating an operation of a communication terminal apparatus to transmit a user introduction request. In the second embodiment, too, the control unit 10 of the communication terminal apparatus 100 receives input of instructions to transmit a user introduction request via the key operation unit 70 and then performs the process of the flowchart illustrated in FIG. 13.

First, the control unit 10 detects state information including the latest biometric information and exercise information via the biometric information sensor 21, the biometric information encoder 22, the exercise information sensor 23, and the exercise information encoder 24, generates a user introduction request including the detected state information, and transmits the request to the DB management server 400 (step S601).

In this case, as in the process in step S501 illustrated in FIG. 12, if the history of state information of the user described with reference to FIG. 3 is frequently detected and is accumulated, the introduction request may be generated by using the latest information of the history.

Also, the introduction request generated in the process in step S601 includes information indicating a user introduction request, a terminal ID of a communication terminal apparatus as a transmission source, state information (biometric information and exercise information), and an extraction condition. Here, the extraction condition indicates a range or similarity of biometric information and exercise information, as in the case of the extraction condition included in the above-described content data recommendation request, and it is set that, for example, pulses and a walking tempo are at the same level, for example, "±5".

Then, the control unit 10 of the communication terminal apparatus 100 that has transmitted the user introduction request receives introduction information transmitted from the DB management server 400 in response to the introduction request transmitted by the apparatus, and updates the associated information DB 82 based on the introduction information (step S602). The DB management server 400 manages the histories of state information from all the communication terminal apparatuses 100(1), 100(2), 100(3), ..., and 100(n) connectable to the DB management server 400 in units of users and thus can generate introduction information in view of all the histories. The communication terminal apparatus 100 as a requesting source can obtain the same introduction information as in the case of obtaining introduction information of users from each of all the communication terminal apparatuses 100(1), 100(2), 100(3), ..., and 100(n) only by communicating with the DB management server.

Then, the control unit 10 of the communication terminal apparatus 100 that has transmitted the user introduction request extracts a candidate satisfying a predetermined condition from the associated information DB 82 in accordance with the extraction condition included in the introduction request, considering that various pieces of information are accumulated in the associated information DB 82 (step S603).

Then, the control unit 10 of the communication terminal apparatus 100 introduces (presents) a user of another communication terminal apparatus who satisfies the extraction condition in the relationship with the biometric information and exercise information of the user of the communication terminal apparatus 100 that has transmitted the user introduction request to the user of the communication terminal apparatus 100 based on the associated information extracted to become a candidate (step S604).

Then, the user of the communication terminal apparatus 100 that has transmitted the introduction request performs a process of contacting the user of another communication terminal apparatus so as to communicate with the selected user (step S605), and then the process illustrated in FIG. 13 ends.

Also, in the process illustrated in FIG. 13, information satisfying the extraction condition is extracted in step S603 considering that previously obtained information is also held in the associated information DB 82, but the present invention is not limited to this. If the information stored in the associated information DB 82 is cleared when an information provision request is newly transmitted, only data transmitted in response to the newly transmitted information provision request can be stored in the associated information DB 82. In that case, the process in step S603 illustrated in FIG. 13 can be omitted.

By performing the process illustrated in FIG. 13, a user of another communication terminal apparatus whose biometric information and exercise information are in the same or similar state as that of the user can be introduced. Thus, a new communication tool enabling users who are jogging at a similar walking tempo and having the same level of pulses and sweating state to encourage each other or to give an advice to each other can be provided. Furthermore, the communication terminal apparatus 100 as a requesting source needs to communicate with only the DB management server 400, so that time and load to collect recommendation information can be saved.

[About Operation of DB Management Server 400]

Figure 14:
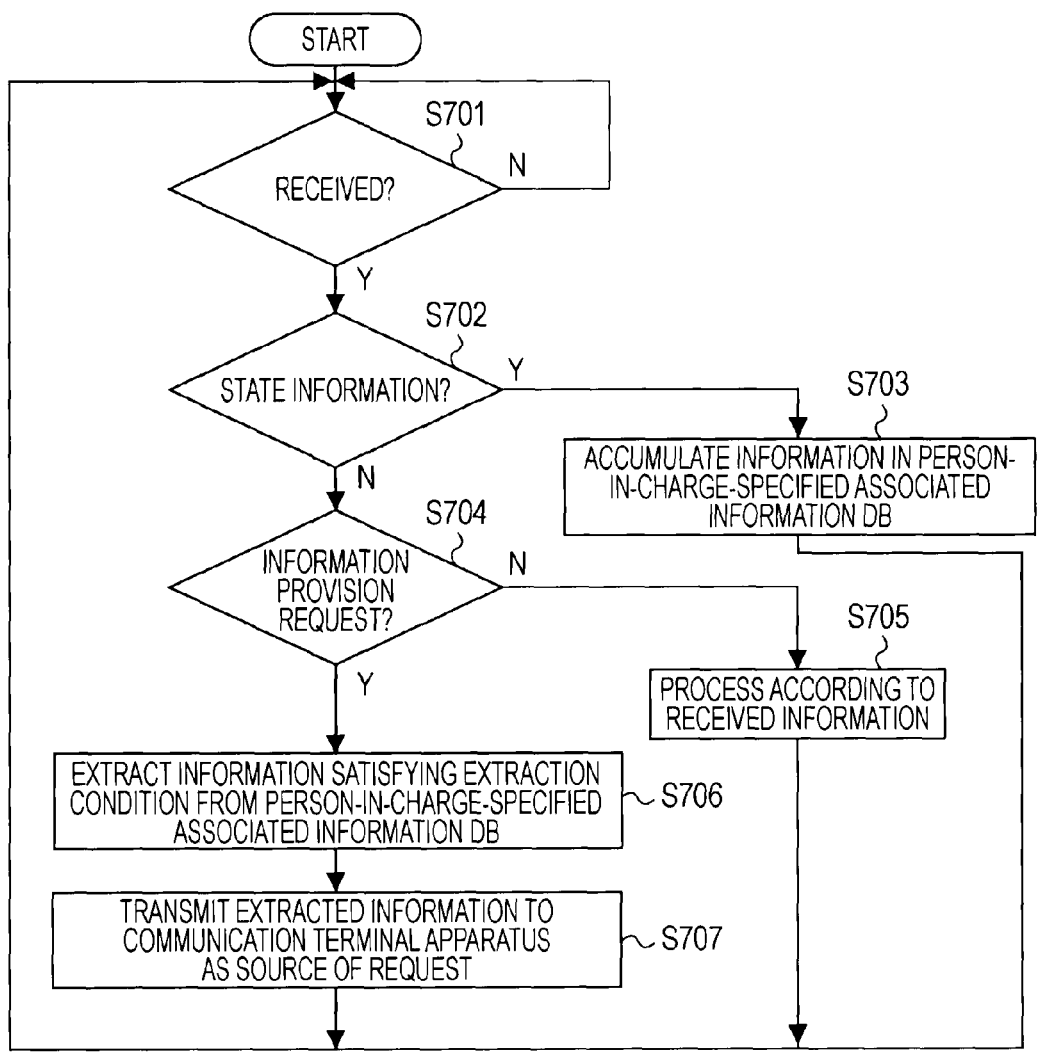
FIG. 14 is a flowchart illustrating an operation of the DB management server 400.

FIG. 14 is a flowchart illustrating an operation of the DB management server 400 according to the second embodiment. Basically, in the DB management server 400 according to the second embodiment, the control unit 410 constantly performs the process illustrated in FIG. 14.

That is, the control unit 410 of the DB management server 400 is waiting for reception via the communication I/F 401 (step S701). If the control unit 410 determines in the determining process in step S701 that reception in the DB management server 400 occurs, the control unit 410 determines whether the received information is a history of state information from the communication terminal apparatus 100 (step S702).

If the control unit 410 determines in the determining process in step S702 that the received information is a history of state information from the communication terminal apparatus 100, the control unit 410 accumulates the received history of state information in the person-in-charge-specified associated information DB (step S703), and then the process from step S701 is repeated.

If the control unit 410 determines in the determining process in step S702 that the received information is not the history of state information from the communication terminal apparatus 100, the control unit 410 determines whether the received information is an information provision request, such as a content data recommendation request or a user introduction request (step S704).

If the control unit 410 determines in the determining process in step S704 that the received information is not an information provision request, the control unit 410 performs a process according to the received information (step S705), and then the process from step S701 is repeated.

On the other hand, if the control unit 410 determines in the determining process in step S704 that the received information is an information provision request, the control unit 410 extracts information that matches the extraction condition (step S706), transmits the extracted information to the communication terminal apparatus as a source of the information provision request (step S707), and then the process from step S701 is repeated.

In this way, the DB management server 400 according to the second embodiment can receive provision of histories of state information from the respective communication terminal apparatuses 100(1), 100(2), 100(3), . . . , and 100(n), accumulate the histories in the user-specific associated information DB 403, and manage them in units of users. Also, the DB management server 400 can accept a content data recommendation request or a user introduction request, extract matching information from the user-specific associated information DB in accordance with the biometric information, exercise information, and extraction condition included in the request, and return (transmit) the extracted information to the communication terminal apparatus 100 as a requesting source.

In this way, the DB management server 400 of the second communication system can collectively manage histories of state information from the respective communication terminal apparatuses 100(1), 100(2), 100(3), . . . , and 100(n), extract information that matches the biometric information and exercise information of the user of the communication terminal apparatus and the extraction condition in accordance with an information provision request from each of the communication terminal apparatuses 100(1), 100(2), 100(3), . . . , and 100(n), and provide the extracted information to the communication terminal apparatus as a requesting source.

In any of the above-described first and second embodiments, matching of biometric information and exercise information is performed so that information can be easily provided or communication can be easily performed between people having the same biometric and exercise information of the moment, that is, between people having the same or similar psychological state.

In the real world, a phenomenon that a plurality of people living in the same place have similarity in physiological and psychological states is known. The present invention enables establishment of an information providing system taking advantage of a characteristic pursuant to the phenomenon via a network.

Incidentally, biometric information is not limited to that described in the above-described embodiments. Various pieces of measurable biometric information including a breathing rate and a blood pressure may be of course used. Also, exercise information is not limited to an exercise tempo and an exercise state, and various pieces of information that change by exercise, such as an estimated exercise distance and consumed calories, may be used.

Also, in the above-described first and second embodiments, a case where the communication terminal apparatus according to the present invention is applied to a mobile communication terminal apparatus is described as an example, but the present invention is not limited to this. The communication terminal apparatus according to the present invention can be applied to various fitness machines used in a fitness club or the like. Furthermore, when exercise information is not taken into consideration, the communication terminal apparatus according to the present invention can be applied to electronic apparatuses used in a predetermined position in a home, such as an AV (audio/visual) apparatus, an audio apparatus, and a personal computer.

Also, the communication terminal apparatus according to the present invention can be realized by creating a program (software) corresponding to the flowcharts illustrated in FIGS. 6, 7, 8, 11, 12, and 13 and installing the program into an electronic apparatus, such as a mobile phone terminal including a biometric information sensor, an exercise information sensor, a storage device unit, and so on.

Also, the server apparatus according to the present invention can be realized by creating a program (software) corresponding to the flowchart illustrated in FIG. 14 and installing the program into a personal computer having a communicating function.

That is, the program performing the processes corresponding to the respective flowcharts in FIGS. 6, 7, 8, 11, 12, 13, and 14 is the program according to the present invention.

The invention claimed is:

1. A communication terminal apparatus, comprising:
    detecting means for detecting state information of a first user, the state information including exercise information that specifies a type and a tempo of exercise being performed by the first user, and biometric data including at least one of a pulse rate, body temperature, heart rate, myoelectrical potential, brain wave activity, perspiration level, and pupil diameter of the first user;
    first storage means for storing and holding the state information, detected by the detecting means, in association with predetermined additional information that includes a content identifier of content data being reproduced for the first user when the state information was detected;
    request transmitting means for transmitting a music information request including the state information detected by the detecting means to another terminal apparatus;
    information receiving means for receiving music information that is transmitted in response to the music information request transmitted by the request transmitting means, the music information corresponding to state information of another user, at the another terminal apparatus that received the transmitted music information request, which matches the state information of the first user;
    presenting means for presenting one of the music information received by the information receiving means and content specified by the music information, to the first user;
    request receiving means for receiving a music information request, from another terminal apparatus, including state information of another user at the another terminal apparatus that sent the music information request;
    extracting means for extracting information to be provided to the another terminal apparatus that sent the music information request, from the first storage means, based on the state information included in the received music information request, when receiving the music information request by the request receiving means; and
    information transmitting means for transmitting music information generated based on the information extracted by the extracting means to the another terminal apparatus that sent the music information request.

2. The communication terminal apparatus according to claim 1, further comprising:
    another-apparatus information receiving means for receiving another-apparatus information that specifies an association between the state information included in the received music information request and predetermined additional information that includes a content identifier of content data being reproduced for the another user, at the another apparatus that sent the music information request, when the state information, of the another user at the another apparatus that sent the music information request, was detected; and
    second storage means for storing and holding the another-apparatus information received by the another-apparatus information receiving means,
    wherein the extracting means extracts the information to be provided to the another terminal apparatus that sent the music information request from the state information and the predetermined additional information stored in the first storage means and the another-apparatus information stored in the second storage means.

3. The communication terminal apparatus according to claim 1, wherein measurements corresponding to at least one piece of the biometric data are measurable in the body of the first user.

4. The communication terminal apparatus according to claim 1, wherein the predetermined additional information includes identification information of the communication terminal apparatus.

5. The communication terminal apparatus according to claim 1, wherein the request transmitting means further transmits a predetermined extraction condition that specifies a type of the state information of the first user that is to be matched with a corresponding type of the state information of the another user at the another terminal apparatus that received the music information request.

6. The communication terminal apparatus according to claim 1, wherein the music information request is recommendation request for the content.

7. An information providing method used in a communication terminal apparatus, comprising:
    a detecting step of detecting state information of a first user, the state information including exercise information that specifies a type and a tempo of exercise being performed by the first user, and biometric data that includes at least one of a pulse rate, body temperature, heart rate, myoelectrical potential, brain wave activity, perspiration level, and pupil diameter of the first user;
    a first recording step of recording the state information, in a first storage means, in association with predetermined additional information that includes a content identifier of content data being reproduced for the first user when the state information was detected;
    a request transmitting step of transmitting a music information request including the state information detected in the detecting step to another terminal apparatus;
    an information receiving step of receiving music information that is transmitted in response to the music information request transmitted in the request transmitting step, the music information corresponding to state information of another user, at the another terminal apparatus that received the transmitted music information request, which matches the state information of the first user;
    a presenting step of presenting one of the music information received in the information receiving step and content specified by the music information to the first user;
    a request receiving step of receiving a music information request, from another terminal apparatus, including state information of another user at the another terminal apparatus that sent the music information request;
    an extracting step of extracting information to be music to the another terminal apparatus that sent the music information request, from the information stored in the first storage means based on the state information included in the received music information request, when receiving the music information request in the request receiving step; and
    an information transmitting step of generating music information based on the information extracted in the extracting step and transmitting the music information to the another terminal apparatus that sent the music information request.

8. A non-transitory computer readable storage medium having computer readable program codes embodied in the computer readable storage medium that, when executed, cause a computer in a communication terminal apparatus to execute:

a detecting step of detecting state information of a first user, the state information including exercise information that specifies a type and a tempo of exercise being performed by the first user, and biometric data that includes at least one of a pulse rate, body temperature, heart rate, myoelectrical potential, brain wave activity, perspiration level, and pupil diameter of the first user;

a first recording step of recording the state information, in a first storage means, in association with predetermined additional information that includes a content identifier of content data being reproduced for the first user when the state information was detected;

a request transmitting step of transmitting a music information request including the state information detected in the detecting step to another terminal apparatus;

an information receiving step of receiving music information that is transmitted in response to the music information request transmitted in the request transmitting step, the music information corresponding to state information of another user, at the another terminal apparatus that received the transmitted music information request, which matches the state information of the first user;

a presenting step of presenting one of the music information received in the information receiving step and content specified by the music information to the first user;

a request receiving step of receiving music information request, from another terminal apparatus, including state information of another user at the another terminal apparatus that sent the music information request;

an extracting step of extracting information to be provided to the another terminal apparatus that sent the music information request, from the information stored in the first storage means based on the state information included in the received music information request, when receiving the music information request in the request receiving step; and an information transmitting step of generating music information based on the information extracted in the extracting step and transmitting the music information to the another terminal apparatus that sent the music information request.

\* \* \* \* \*